(12) United States Patent
Wang et al.

(10) Patent No.: US 12,483,064 B2
(45) Date of Patent: Nov. 25, 2025

(54) DEVICE TRIGGERING BACKSCATTER COMMUNICATIONS

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 17/746,797

(22) Filed: May 17, 2022

(65) Prior Publication Data
US 2023/0378807 A1    Nov. 23, 2023

(51) Int. Cl.
*H02J 50/00*    (2016.01)
*H04W 4/80*    (2018.01)
*H04W 24/08*    (2009.01)
*H04W 72/1263*    (2023.01)
*H04W 74/0833*    (2024.01)

(52) U.S. Cl.
CPC ............ *H02J 50/001* (2020.01); *H04W 4/80* (2018.02); *H04W 24/08* (2013.01); *H04W 72/1263* (2013.01); *H04W 74/0833* (2013.01)

(58) Field of Classification Search
None
See application file for complete search history.

(56) References Cited

U.S. PATENT DOCUMENTS

| 2010/0253281 A1* | 10/2010 | Li | H02J 50/90 |
| | | | 320/108 |
| 2010/0265896 A1* | 10/2010 | Park | H04W 72/21 |
| | | | 370/329 |

(Continued)

FOREIGN PATENT DOCUMENTS

| WO | WO-2020204303 A1 | 10/2020 |
| WO | WO-2022241780 A1 * | 11/2022 |
| WO | WO-2023023472 A1 | 2/2023 |

OTHER PUBLICATIONS

International Search Report and Written Opinion—PCT/US2023/020252—ISA/EPO—Aug. 21, 2023.

*Primary Examiner* — Gennadiy Tsvey
(74) *Attorney, Agent, or Firm* — Holland & Hart LLP

(57) ABSTRACT

Methods, systems, and devices for wireless communications are described. Described techniques provide for signaling for configuring energy scheduling requests or communications scheduling requests from a semi-passive user equipment (UE) to the network. A semi-passive UE may transmit a message indicating a UE class type to a serving network entity (e.g., indicating that the UE is a semi-passive UE). The network entity may transmit control signaling indicating a configuration for the UE to transmit energy scheduling requests or communications scheduling requests. The UE may transmit an energy scheduling request or communications scheduling request in accordance with the configuration. In response to an energy scheduling request, the network entity may indicate a resource for an energy transfer signal, and the UE may monitor for and receive an energy transfer signal in the indicated resource. In response to a communications scheduling request, the network entity may indicate a resource for a data transmission.

30 Claims, 18 Drawing Sheets

(56) References Cited

U.S. PATENT DOCUMENTS

| | | | | |
|---|---|---|---|---|
| 2011/0065453 A1* | 3/2011 | Baldemair | ............. | H04B 17/27 |
| | | | | 455/456.1 |
| 2011/0184888 A1* | 7/2011 | Lee | .................... | H02J 7/00045 |
| | | | | 320/108 |
| 2014/0092421 A1* | 4/2014 | Shibata | ............... | H04N 1/00233 |
| | | | | 358/1.14 |
| 2015/0171931 A1* | 6/2015 | Won | ........................ | H02J 50/80 |
| | | | | 320/108 |
| 2015/0194838 A1* | 7/2015 | Won | ........................ | H04B 5/24 |
| | | | | 320/108 |
| 2015/0237463 A1* | 8/2015 | Stuttle | .................... | H04W 4/33 |
| | | | | 455/456.3 |
| 2015/0303741 A1* | 10/2015 | Malik | ................... | H02J 50/001 |
| | | | | 307/104 |
| 2016/0192386 A1* | 6/2016 | Kim | .................. | H04W 72/0453 |
| | | | | 370/329 |
| 2016/0234022 A1* | 8/2016 | Motika | ................ | H04L 9/3213 |
| 2018/0060713 A1* | 3/2018 | Thueringer | ......... | G06K 19/0723 |
| 2018/0138744 A1* | 5/2018 | Lagnado | ................. | H02J 50/10 |
| 2019/0052116 A1* | 2/2019 | Bae | ........................ | H02J 50/90 |
| 2020/0220391 A1* | 7/2020 | Zeine | ...................... | H02J 50/20 |
| 2020/0244108 A1* | 7/2020 | Kim | ........................ | H04B 5/79 |
| 2021/0135721 A1* | 5/2021 | Lopez | ...................... | H04B 7/08 |
| 2021/0167638 A1* | 6/2021 | Yahagi | ................. | H02J 50/402 |
| 2021/0168733 A1 | 6/2021 | Kim et al. | | |
| 2021/0286958 A1* | 9/2021 | Myers | ..................... | G06K 7/10 |
| 2021/0385814 A1 | 12/2021 | Abotabl et al. | | |
| 2022/0225402 A1* | 7/2022 | Elkotby | ................. | H02J 50/20 |
| 2023/0057994 A1* | 2/2023 | Elkotby | ............... | H02J 50/001 |
| 2023/0105296 A1* | 4/2023 | Polu | ..................... | H02J 7/0013 |
| | | | | 320/108 |

\* cited by examiner

DEVICE TRIGGERING BACKSCATTER COMMUNICATIONS

TECHNICAL FIELD

The following relates to wireless communications, including device triggering backscatter communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support device triggering backscatter communications. For example, described techniques provide for signaling for configuring energy scheduling requests or communications scheduling requests from a semi-passive user equipment (UE) to the network. A semi-passive UE may transmit a message indicating a UE class type of the UE to a serving network entity (e.g., indicating that the UE is a semi-passive UE). In response, the network entity may transmit control signaling indicating a configuration for the UE to transmit energy scheduling requests or communications scheduling requests. The UE may transmit an energy scheduling request or communications scheduling request in accordance with the configuration. In response to an energy scheduling request, the network entity may indicate a resource for an energy transfer signal, and the UE may monitor for and receive an energy transfer signal in the indicated resource. The UE may perform energy harvesting using the energy transfer signal. In response to a communications scheduling request, the network entity may indicate a resource for a data transmission. The UE may communicate a data transmission using the indicated resource.

A method for wireless communications at a UE is described. The method may include transmitting a first control message indicating a UE class associated with the UE, where the UE class is associated with energy harvesting, receiving control signaling indicating a set of resources for transmitting energy scheduling requests associated with energy harvesting based on the first control message, transmitting an energy scheduling request associated with energy harvesting via the set of resources, and monitoring, based on the energy scheduling request, for a second control message indicating scheduling information for an energy transfer signal.

An apparatus for wireless communications at a UE is described. The apparatus may include at least one processor, memory coupled with the at least one processor, and instructions stored in the memory. The instructions may be executable by the at least one processor to cause the UE to transmit a first control message indicating a UE class associated with the UE, where the UE class is associated with energy harvesting, receive control signaling indicating a set of resources for transmitting energy scheduling requests associated with energy harvesting based on the first control message, transmit an energy scheduling request associated with energy harvesting via the set of resources, and monitor, based on the energy scheduling request, for a second control message indicating scheduling information for an energy transfer signal.

Another apparatus for wireless communications at a UE is described. The apparatus may include means for transmitting a first control message indicating a UE class associated with the UE, where the UE class is associated with energy harvesting, means for receiving control signaling indicating a set of resources for transmitting energy scheduling requests associated with energy harvesting based on the first control message, means for transmitting an energy scheduling request associated with energy harvesting via the set of resources, and means for monitoring, based on the energy scheduling request, for a second control message indicating scheduling information for an energy transfer signal.

A non-transitory computer-readable medium storing code for wireless communications at a UE is described. The code may include instructions executable by at least one processor to transmit a first control message indicating a UE class associated with the UE, where the UE class is associated with energy harvesting, receive control signaling indicating a set of resources for transmitting energy scheduling requests associated with energy harvesting based on the first control message, transmit an energy scheduling request associated with energy harvesting via the set of resources, and monitor, based on the energy scheduling request, for a second control message indicating scheduling information for an energy transfer signal.

Some examples of the method, apparatuses, and non-transitory computer-readable medium described herein may further include operations, features, means, or instructions for receiving, based on the monitoring, the second control message indicating the scheduling information for the energy transfer signal and performing energy harvesting using the energy transfer signal according to the scheduling information.

In some examples of the method, apparatuses, and non-transitory computer-readable medium described herein, transmitting the energy scheduling request may include operations, features, means, or instructions for transmitting an indication that differentiates the energy scheduling request from a communication scheduling request.

In some examples of the method, apparatuses, and non-transitory computer-readable medium described herein, the control signaling indicating the set of resources for transmitting the energy scheduling request indicates a joint configuration for energy scheduling requests and communication scheduling requests.

Some examples of the method, apparatuses, and non-transitory computer-readable medium described herein may further include operations, features, means, or instructions for transmitting a communications scheduling request in accordance with the joint configuration, transmitting an indication that differentiates the communications scheduling request from the energy scheduling request, and monitoring, based on the communications scheduling request, for a third control message indicating scheduling information for a data transmission.

In some examples of the method, apparatuses, and non-transitory computer-readable medium described herein, transmitting the energy scheduling request may include operations, features, means, or instructions for transmitting the energy scheduling request using a waveform based on a random access channel preamble.

In some examples of the method, apparatuses, and non-transitory computer-readable medium described herein, transmitting the energy scheduling request using the waveform based on the random access channel preamble may include operations, features, means, or instructions for transmitting the energy scheduling request using random access channel resources.

In some examples of the method, apparatuses, and non-transitory computer-readable medium described herein, transmitting the energy scheduling request may include operations, features, means, or instructions for transmitting the energy scheduling request using a waveform based on one or more of: a Barker code, a Zadoff-Chu sequence, or a constant amplitude zero autocorrelation waveform.

Some examples of the method, apparatuses, and non-transitory computer-readable medium described herein may further include operations, features, means, or instructions for detecting, based on the monitoring, an absence of a response to the energy scheduling request within a fixed time period and transmitting a second energy scheduling request based on the absence of the response to the energy scheduling request within the fixed time period.

Some examples of the method, apparatuses, and non-transitory computer-readable medium described herein may further include operations, features, means, or instructions for repeating transmission of the energy scheduling request up to a fixed number of times until the UE receives the second control message indicating scheduling information for the energy transfer signal.

Some examples of the method, apparatuses, and non-transitory computer-readable medium described herein may further include operations, features, means, or instructions for receiving an indication of the fixed number of times.

Some examples of the method, apparatuses, and non-transitory computer-readable medium described herein may further include operations, features, means, or instructions for receiving, with the control signaling, an indication of a separate set of resources for transmitting a communications scheduling request, transmitting the communications scheduling request via the separate set of resources, and monitoring, based on the communications scheduling request, for a third control message indicating scheduling information for a data transmission.

Some examples of the method, apparatuses, and non-transitory computer-readable medium described herein may further include operations, features, means, or instructions for transmitting the energy scheduling request may be based on one or more of a battery state of the UE, a power input signal strength of the UE, an energy level for one or more communications tasks at the UE, or an energy level for one or more sensor tasks at the UE.

In some examples of the method, apparatuses, and non-transitory computer-readable medium described herein, the UE class indicates that the UE includes passive radio circuitry and active radio circuitry.

Some examples of the method, apparatuses, and non-transitory computer-readable medium described herein may further include operations, features, means, or instructions for transitioning to an energy harvesting state based on transmitting the energy scheduling request.

Some examples of the method, apparatuses, and non-transitory computer-readable medium described herein may further include operations, features, means, or instructions for transmitting a communications scheduling request and transitioning from an active radio state using the active radio circuitry to a passive radio state using the passive radio circuitry based at least in part transmitting the communications scheduling request.

A method for wireless communications at a network entity is described. The method may include receiving, from a UE, a first control message indicating a UE class associated with the UE, where the UE class is associated with energy harvesting, transmitting, to the UE, control signaling indicating a set of resources for transmitting an energy scheduling requests associated with energy harvesting based on the first control message, receiving, from the UE, an energy scheduling request associated with energy harvesting via the set of resources, and transmitting, to the UE based on the energy scheduling request, a second control message indicating scheduling information for an energy transfer signal.

An apparatus for wireless communications at a network entity is described. The apparatus may include at least one processor, memory coupled with the at least one processor, and instructions stored in the memory. The instructions may be executable by the at least one processor to cause the network entity to receive, from a UE, a first control message indicating a UE class associated with the UE, where the UE class is associated with energy harvesting, transmit, to the UE, control signaling indicating a set of resources for transmitting an energy scheduling requests associated with energy harvesting based on the first control message, receive, from the UE, an energy scheduling request associated with energy harvesting via the set of resources, and transmit, to the UE based on the energy scheduling request, a second control message indicating scheduling information for an energy transfer signal.

Another apparatus for wireless communications at a network entity is described. The apparatus may include means for receiving, from a UE, a first control message indicating a UE class associated with the UE, where the UE class is associated with energy harvesting, means for transmitting, to the UE, control signaling indicating a set of resources for transmitting an energy scheduling requests associated with energy harvesting based on the first control message, means for receiving, from the UE, an energy scheduling request associated with energy harvesting via the set of resources, and means for transmitting, to the UE based on the energy scheduling request, a second control message indicating scheduling information for an energy transfer signal.

A non-transitory computer-readable medium storing code for wireless communications at a network entity is described. The code may include instructions executable by a processor to receive, from a UE, a first control message indicating a UE class associated with the UE, where the UE class is associated with energy harvesting, transmit, to the UE, control signaling indicating a set of resources for transmitting an energy scheduling requests associated with energy harvesting based on the first control message, receive, from the UE, an energy scheduling request associated with energy harvesting via the set of resources, and transmit, to the UE based on the energy scheduling request, a second control message indicating scheduling information for an energy transfer signal.

Some examples of the method, apparatuses, and non-transitory computer-readable medium described herein may further include operations, features, means, or instructions for transmitting the energy transfer signal according to the scheduling information.

In some examples of the method, apparatuses, and non-transitory computer-readable medium described herein, receiving the energy scheduling request may include operations, features, means, or instructions for receiving an indication that differentiates the energy scheduling request from a communication scheduling request.

In some examples of the method, apparatuses, and non-transitory computer-readable medium described herein, the control signaling indicating the set of resources for transmitting the energy scheduling request indicates a joint configuration for energy scheduling requests and communication scheduling requests.

Some examples of the method, apparatuses, and non-transitory computer-readable medium described herein may further include operations, features, means, or instructions for receiving a communications scheduling request in accordance with the joint configuration, receiving an indication that differentiates the communications scheduling request from the energy scheduling request, and transmitting, based on the communications scheduling request, a third control message indicating scheduling information for a data transmission.

In some examples of the method, apparatuses, and non-transitory computer-readable medium described herein, receiving the energy scheduling request may include operations, features, means, or instructions for receiving the energy scheduling request using a waveform based on a random access channel preamble.

In some examples of the method, apparatuses, and non-transitory computer-readable medium described herein, receiving the energy scheduling request using the waveform based on the random access channel preamble may include operations, features, means, or instructions for receiving the energy scheduling request using random access channel resources.

In some examples of the method, apparatuses, and non-transitory computer-readable medium described herein, receiving the energy scheduling request may include operations, features, means, or instructions for receiving the energy scheduling request using a waveform based on one or more of: a Barker code, a Zadoff-Chu sequence, or a constant amplitude zero autocorrelation waveform.

Some examples of the method, apparatuses, and non-transitory computer-readable medium described herein may further include operations, features, means, or instructions for transmitting, to the UE, an indication of a fixed number of times to repeat transmission of the energy scheduling request.

Some examples of the method, apparatuses, and non-transitory computer-readable medium described herein may further include operations, features, means, or instructions for transmitting, with the control signaling, an indication of a separate set of resources for transmitting a communications scheduling request, receiving, from the UE, the communications scheduling request via the separate set of resources, and transmitting, based on the communications scheduling request, a third control message indicating scheduling information for a data transmission.

In some examples of the method, apparatuses, and non-transitory computer-readable medium described herein, the UE class indicates that the UE includes passive radio circuitry and active radio circuitry.

Some examples of the method, apparatuses, and non-transitory computer-readable medium described herein may further include operations, features, means, or instructions for transitioning from a listening state to an active radio state based on receiving the energy scheduling request.

DETAILED DESCRIPTION

Figure 1:
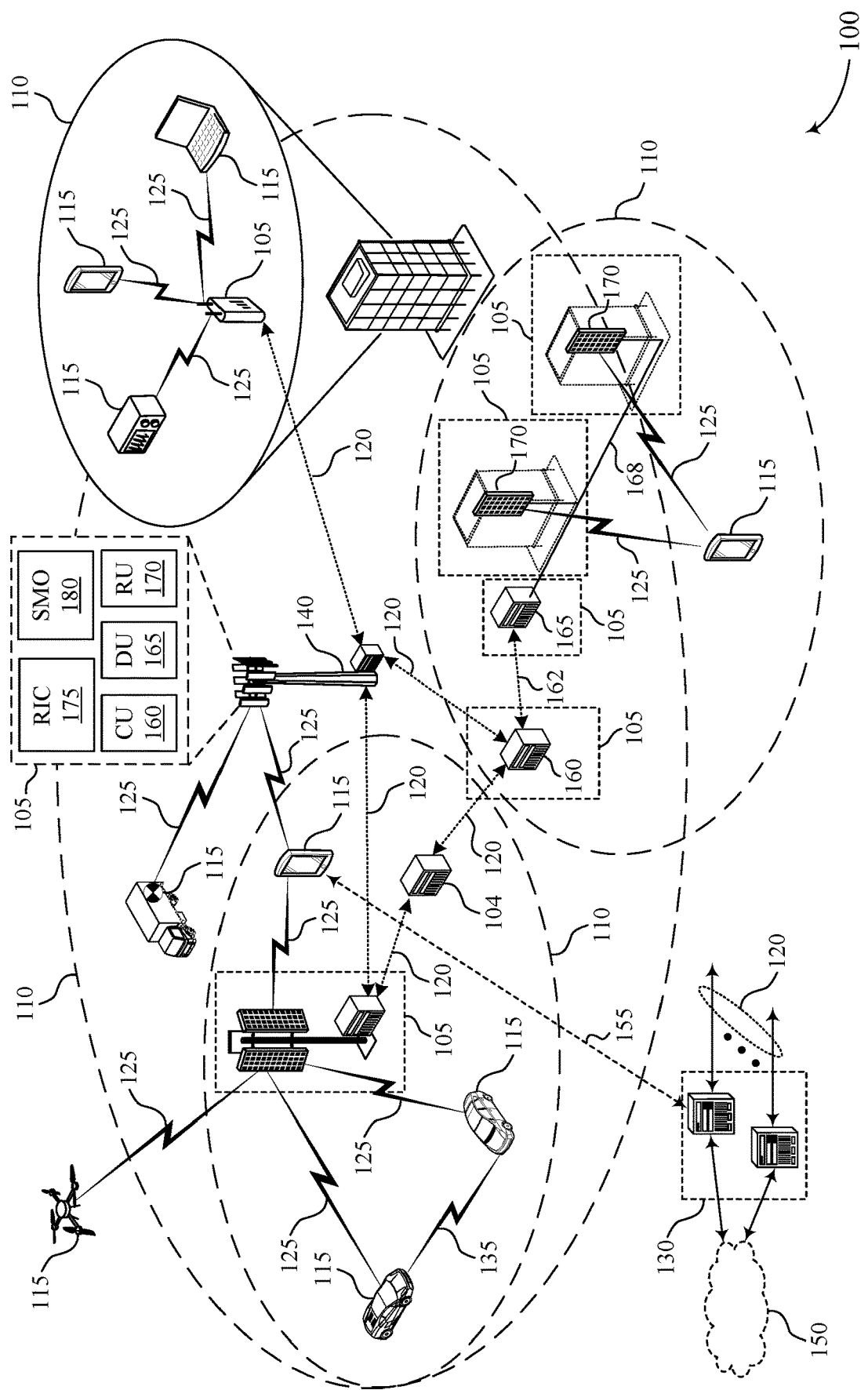
FIG. 1 illustrates an example of a wireless communications system that supports device triggering backscatter communications in accordance with one or more aspects of the present disclosure.

Some devices, such as a user equipment (UE), an internet of things (IoT) device, or a radio frequency identifier (RFID) device, may be configured to perform energy harvesting, meaning that the device may harvest energy from the environment (e.g., solar, heat, or radio frequency (RF) radiation). In particular, some devices may harvest energy from RF radiation. For example, some devices may include dedicated receiver architecture (e.g., a dedicated antenna and energy harvesting circuitry) for harvesting energy from their environments. Some UEs may be configured as passive devices, meaning that the UEs may harvest energy over the air and power the transmission and reception circuitry where the transmitted signal may be backscatter modulated. Some passive UEs may be configured as semi-passive devices, meaning that the UE includes a battery and may perform backscattering based communications (e.g., passive communications initiated by a reader or network entity) and active communications (e.g., UE powered communications which may be initiated by the UE). Currently, there is no defined signaling for a semi-passive UE to request energy transfer resources or communications resources.

The present disclosure relates to signaling for energy scheduling requests or communications scheduling requests from a semi-passive UE to the network. A semi-passive UE may transmit a message indicating a UE class type of the UE to a serving network entity (e.g., indicating that the UE is a semi-passive UE). In response, the network entity may transmit control signaling indicating a configuration for the UE to transmit energy scheduling requests or communications scheduling requests. The UE may transmit an energy scheduling request in accordance with the configuration. For example, the UE may transmit an energy scheduling request if the UE determines a battery level of the UE is below a threshold or if a determined energy level of the UE is below a threshold for communications or sensor tasks at the UE. In response to the energy scheduling request, the network entity may indicate a resource for an energy transfer signal, and the UE may monitor for and receive an energy transfer signal in the indicated resource. The UE may perform energy harvesting using the energy transfer signal. The UE may also transmit a communications scheduling request in accordance with the configuration. In response to the communications scheduling request, the network entity may indicate a resource for a data transmission. For example, the UE may transmit a communications scheduling request based on determining that the UE has data queued to report to the network. The UE may communicate a data transmission using the indicated resource.

Aspects of the disclosure are initially described in the context of wireless communications systems. Aspects of the disclosure are further illustrated by and described with reference to block diagrams and process flows. Aspects of the disclosure are further illustrated by and described with reference to apparatus diagrams, system diagrams, and flowcharts that relate to device triggering backscatter communications.

FIG. 1 illustrates an example of a wireless communications system 100 that supports device triggering backscatter communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support device triggering backscatter communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), etc., and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

UEs 115 may belong to different classes of UE 115 types that include active radio UEs 115, semi-passive radio UEs 115, and passive radio UEs 115. Example active radio UEs 115 include: eMBB UEs 115 configured to operate at a 100 MHz bandwidth with 1 transmitter port and 4 receiver ports and at 2.3 Gbps; Release 17 reduced capability UEs 115 configured to operate at 20 MHz bandwidth with 1 transmitter port and 1 or 2 receiver ports and 150 Mbps; Release 18 reduced capability UEs 115 configured to operate at 5 or 1.4 MHz with 1 transmitter port and 1 receiver port and 3 Mbps; eMTC Cat-M1 UEs configured to operate at 1.4 MHz with 1 transmitter port and 1 receiver port 1 Mbps; narrowband (NB) IoT UEs configured to operate at operate at 180 kHz with 1 transmitter port and 1 receiver port and 25 kbps. Passive radio UEs may include passive IoT UEs 115. Semi-passive UEs 115 may include both active radio circuitry and passive radio circuitry. Reduced capability UEs 115 may operate at smaller bandwidths, with less antenna ports, and peak rate reduction, leading to lower cost, and lower power UE categories.

Radio frequency identifier (RFID) is a rapidly growing technology that may impact many industries due to the potential for applications such as inventory and asset management, IoT, sustainable sensor networks (e.g., in factories), agriculture, and smart homes. RFID technology includes small transponders, or "tags," which emit an information-bearing signal upon reception of a signal at the tag. RFID tags may be operated with no battery or with a low operating expense batter, may be associated with little maintenance, and long life. Passive RFID devices may harvest energy over the air and power the transmission/reception circuitry, where the transmitted signal may be backscatter modulated. Semi-passive or active RFID tags may be associated with higher costs as compared to passive RFID tags.

Wireless communications systems, such as wireless communications system 100, may include industrial verticals besides eMBB. For example, URLLC, MTC, 5G and beyond may be expanded to support passive IoT. For example, some communications systems, such as wireless communications system 100, may manage passive IoT devices. Potential use cases for RFID type sensors (e.g., passive IoT devices) may include asset management, logistics, warehousing, and manufacturing. A network entity 105 may: read or write information stored on passive IoT devices; provide energy to passive IoT devices; reflect information bearing signals from a passive IoT; or read the reflected signal by a passive IoT to decode information transmitted by the IoT.

Passive and semi-passive radio UEs may include energy harvesting circuitry configured to harvest energy from RF radiation. For example, an energy harvesting UE 115 may be an RFID tag, a IoT device, or a semi passive UE 115. To harvest RF energy, the energy harvesting UE 115 may include RF energy harvesting circuitry. RF power harvesting may be non-linear with input power at the power harvesting circuitry (e.g., due to diodes). Typical input power may be larger than −20 decibels. In some examples, −10 decibels may be associated with turning on the power harvesting circuitry. RF energy harvesting may be more efficient at lower frequencies due to diode junction capacitance and resistance (e.g., caused by frequency-selective conversion efficiency).

A passive IoT device may not include a battery, may not support RFID tag initiated data traffic (e.g., the reader talks first), may support backscattering communications without active RF components, may support cyclic redundancy check (CRC) without forward error correction, and may have a limited range (e.g., due to the lack of active radio components). Semi-passive UEs 115 may include low-cost and low-power active radio circuitry to trigger backscattering-based communications. Semi-passive UEs 115 may perform coarse synchronization, may perform low-power forward error correction for uplink transmissions, operate mostly with backscattering, and may be more reliable and have a longer range as compared to passive IoT devices.

A semi-passive UE 115 may transmit a message indicating a UE class type of the UE 115 to a serving network entity 105 (e.g., indicating that the UE 115 is a semi-passive UE 115). In response, the network entity 105 may transmit control signaling indicating a configuration for the UE 115 to transmit energy scheduling requests or communications scheduling requests. The UE 115 may transmit an energy scheduling request in accordance with the configuration. For example, the UE 115 may transmit an energy scheduling request if the UE 115 determines a battery level of the UE 115 is below a threshold or if a determined energy level of the UE 115 is below a threshold for communications or sensor tasks at the UE 115. In response to the energy scheduling request, the network entity 105 may indicate a resource for an energy transfer signal, and the UE 115 may monitor for and receive an energy transfer signal in the indicated resource. The UE 115 may perform energy harvesting using the energy transfer signal. The UE 115 may also transmit a communications scheduling request in accordance with the configuration. In response to the communications scheduling request, the network entity 105 may indicate a resource for a data transmission. For example, the UE 115 may transmit a communications scheduling request based on determining that the UE 115 has data queued to report to the network. The UE 115 may communicate a data transmission using the indicated resource.

Figure 2:
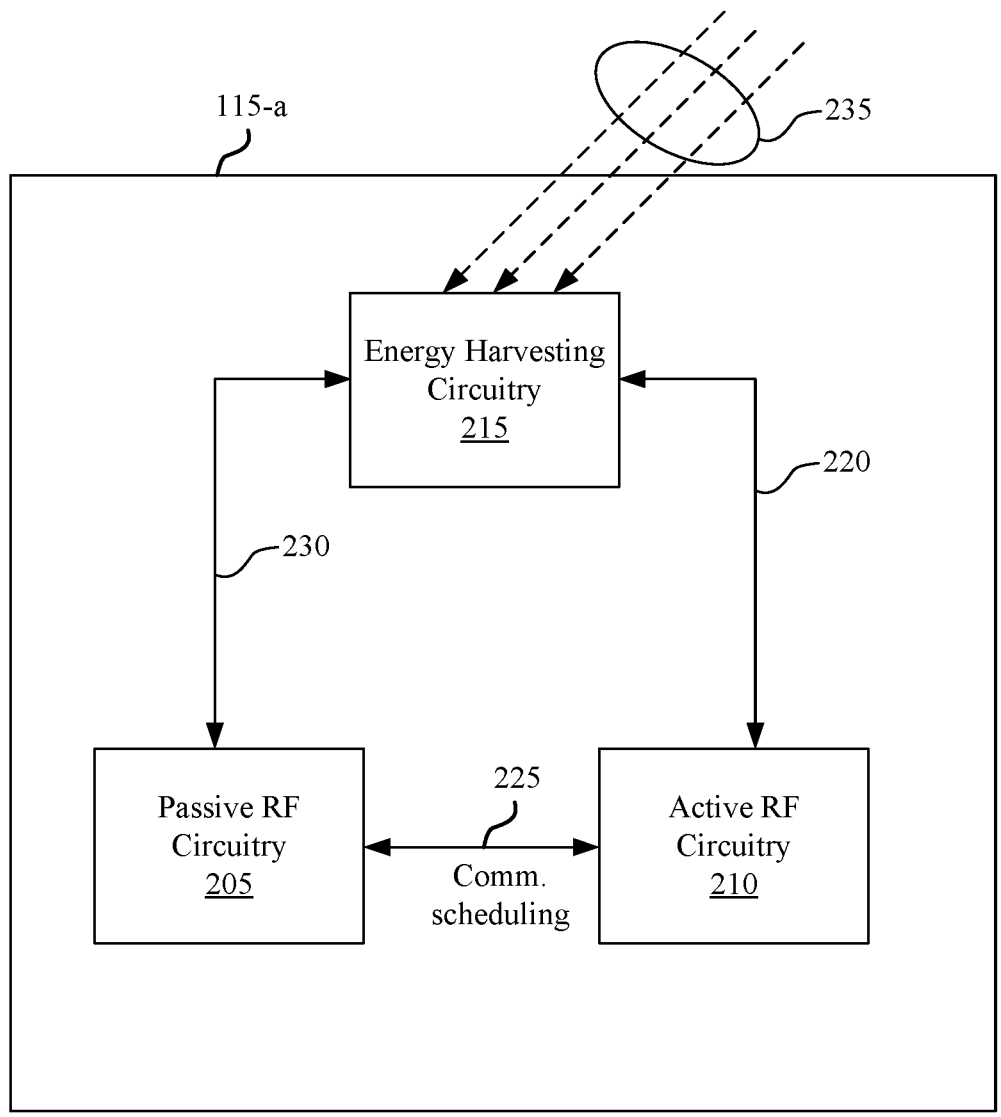
FIG. 2 illustrates an example of a block diagram of a user equipment that supports device triggering backscatter communications in accordance with one or more aspects of the present disclosure.

FIG. 2 illustrates an example of a block diagram 200 of a semi-passive UE 115-a that supports device triggering backscatter communications in accordance with one or more aspects of the present disclosure. In some examples, block diagram 200 may implement aspects of wireless communications system 100. The semi-passive UE 115-a may be an example of a UE 115 as described herein.

The semi-passive UE 115-a may include passive radio circuitry 205, active radio circuitry 210, and energy harvesting circuitry 215. The energy harvesting circuitry 215 may harvest energy from the environment or from dedicated energy transfer signals 235, such as energy transfer signals received in response to energy scheduling requests from the semi-passive UE 115-a. Passive radio circuitry 205 may be used for reader initiated communications 230, similarly to passive IoT devices. The passive radio circuitry 205 may respond to reader initiated communications using backscattering. The active radio circuitry 210 may be used for semi-passive UE 115-a initiated (e.g., RFID tag initiated) communications 220. For example, the active radio circuitry 210 may be used to communicate energy scheduling or communications scheduling signals, such as energy scheduling requests and communications scheduling requests.

The active radio circuitry 210 may communicate based primarily on backscattering. The active radio circuitry 210 may be used under a duty cycle constraint (e.g., X transmissions within s within Y seconds or X mJ used within a time period (e.g., hours or days)). The duty cycle constraint may be configured by a reader (e.g., a network entity 105) based on the battery capacity of the semi-passive UE 115-a. In some cases, the duty cycle constraint may be preconfigured for the semi-passive UE 115-a before the semi-passive UE 115-a establishes a link with a reader. For communications exceeding the duty cycle constraint of the active radio circuitry 210, the semi-passive UE 115-a may switch to use of the passive radio circuitry 205. The semi-passive UE 115-a may indicate to the reader whether the semi-passive UE 115-a is switching to backscattering based communications or the semi-passive UE 115-a may monitor for signals using passive radio circuitry 205 after transmitting using the active radio circuitry 210. The passive radio circuitry 205 or the active radio circuitry 210 may be used to receive communications scheduling signals 225 from a reader or network entity 105.

The semi-passive UE 115-*a* may actively generate signals and may perform coarse synchronization for a random access channel (RACH) procedure. The active radio circuitry 210 may be less complex than other classes of UE, and the output power of the active radio communications 220 may be less than other classes of UE.

Figure 3:
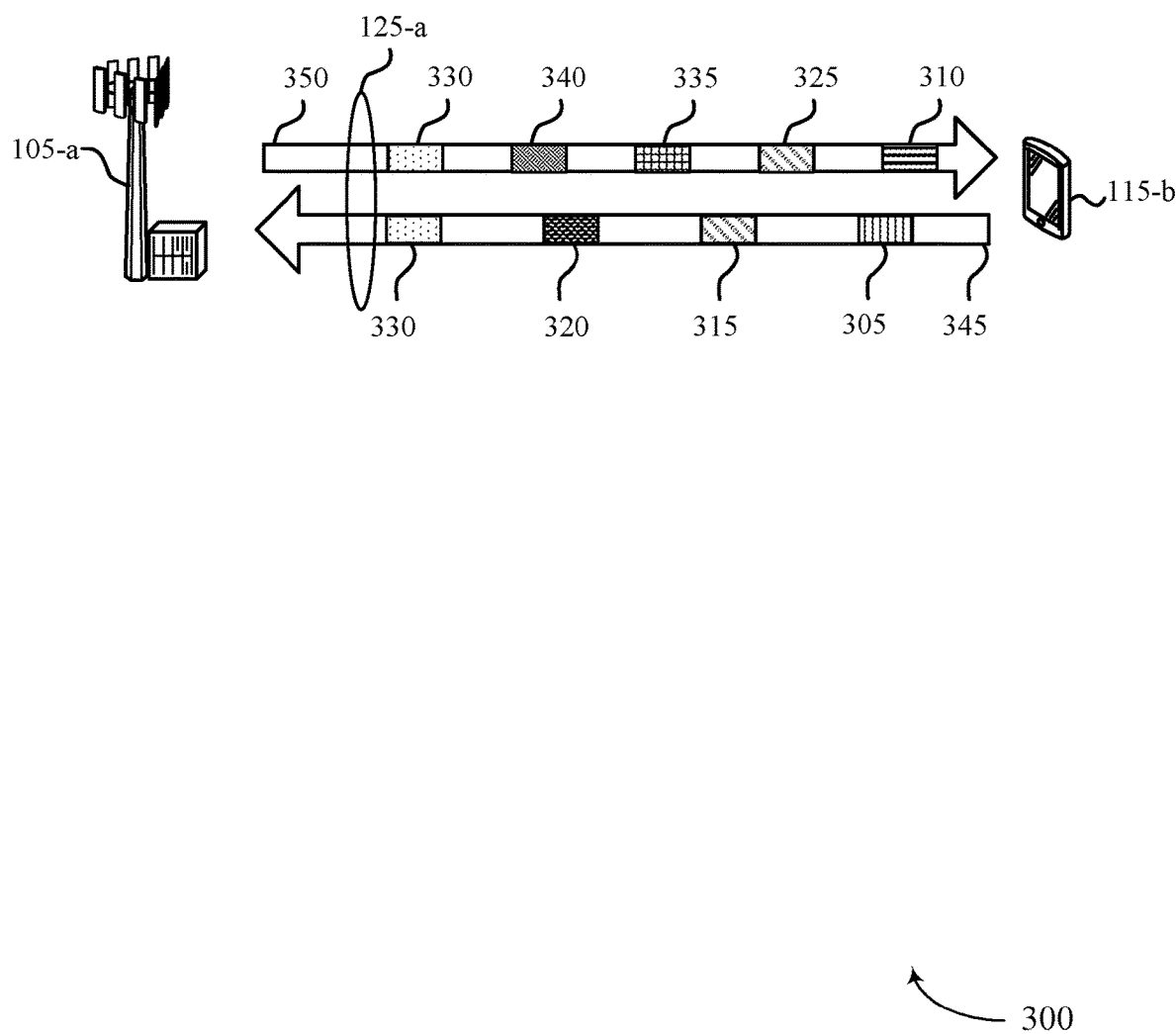
FIG. 3 illustrates an example of a wireless communications system that supports device triggering backscatter communications in accordance with one or more aspects of the present disclosure.

FIG. 3 illustrates an example of a wireless communications system 300 that supports device triggering backscatter communications in accordance with one or more aspects of the present disclosure. In some examples, the wireless communications system 300 may implement aspects of wireless communications system 100. The wireless communications system 300 may include a UE 115-*b*, which may be an example of a UE 115 as described herein. The wireless communications system 300 may include a network entity 105-*a*, which may be an example of a network entity 105 as described herein.

The UE 115-*b* may communicate with the network entity 105-*a* using a communication link 125-*a*, which may be examples of an NR or LTE link between the UE 115-*b* and the network entity 105-*a*. The communication link 125-*a* may include a bi-directional link that enables both uplink and downlink communication. For example, the UE 115-*b* may transmit uplink signals 345, such as uplink control signals or uplink data signals, to the network entity 105-*a* using the communication link 125-*a* and the network entity 105-*a* may transmit downlink signals 350, such as downlink control signals or downlink data signals, to the UE 115-*b* using the communication link 125-*a*.

The UE 115-*b* may be a semi-passive UE, as described herein. The network entity 105-*a* and the UE 115-*b* may configure resources or formats for transmitting energy scheduling requests 315 or communications scheduling requests 320 from the UE 115-*b* to the network entity 105-*a*.

In some cases, the UE 115-*b* may be configured to transmit an energy scheduling request 315 based on one or more triggering conditions. For example, if a battery state of charge of the UE 115-*b* is below a threshold (e.g., 10% of the battery rated capacity), the UE 115-*b* may transmit an energy scheduling request 315. As another example, if an ambient signal strength of the UE 115-*b* is below a threshold (e.g., Pin<−20 dBm) or below the sensitivity of the energy harvesting circuitry of the UE 115-*b*, the UE 115-*b* may transmit an energy scheduling request 315. As another example, if both the battery state of charge of the UE 115-*b* is below a threshold and the ambient signal strength of the UE 115-*b* is below a threshold or the ambient signal strength of the UE 115-*b* is below the sensitivity of the energy harvesting circuitry of the UE 115-*b*, the UE 115-*b* may transmit an energy scheduling request 315. As another example, if the UE 115-*b* has insufficient energy for expected or scheduled traffic transmissions, or the battery level (plus energy harvesting at the current power level) cannot sustain the next traffic transmission, the UE 115-*b* may transmit an energy scheduling request 315. As another example, if there is insufficient energy for performing sensor or integrated circuit tasks at the UE 115-*b* (e.g., obtaining a temperature reading which uses Y mJ), the UE 115-*b* may transmit an energy scheduling request 315. As another example, if there is insufficient energy for performing a number of X energy scheduling requests 315 or communications scheduling requests 320, the UE 115-*b* may transmit an energy scheduling request 315 (e.g., the UE 115-*b* may maintain an energy level to transmit the number of X energy scheduling requests 315 or communications scheduling requests 320).

In some cases, the UE 115-*b* may be configured to transmit a communications scheduling request 320 based on one or more triggering conditions. For example, if data or traffic becomes available at the UE 115-*b* (e.g., a temperature reading becomes available to report), the UE 115-*b* may transmit a communications scheduling request 320. As another example. the UE 115-*b* may transmit a communications scheduling request 320 for energy status reporting (e.g., to report a low battery level, to request a battery replacement, a battery discharge report, a deep discharge request, or to report battery memory issues).

The UE 115-*b* may transmit a first control message 305 indicating a UE class associated with the UE 115-*b*. For example, the UE class may indicate that the UE 115-*b* is a semi-passive UE that includes energy harvesting circuitry, passive radio circuitry, and active radio circuitry. In response, the network entity 105-*a* may transmit control signaling that configures resources for the UE 115-*b* for the UE 115-*b* to transmit energy scheduling requests 315 or communications scheduling requests 320.

In some cases, the control signaling 310 may configure a unified configuration for scheduling requests (e.g., the same resource may be configured for energy scheduling requests 315 and communications scheduling requests 320). When the UE 115-*b* transmits an energy scheduling requests 315 and communications scheduling requests 320, the UE 115-*b* may transmit an indication (e.g., via backscattering communications) of whether the scheduling request is an energy scheduling request 315 or a communications scheduling request 320.

In some cases, the control signaling 310 may configure two types of scheduling requests (e.g., the different resources may be configured for energy scheduling requests 315 and communications scheduling requests 320). When the network entity 105-*a* receives the energy scheduling requests 315 or communications scheduling requests 320 via a respective communications resource, the network entity 105-*a* may schedule resources for an energy transfer signal 325 or resources for communications 330. The network entity 105-*a* may transmit a second control message 335 in response to an energy scheduling request 315 that indicates scheduling information for an energy transfer signal 325. Accordingly, the UE 115-*b* may monitor for and perform energy harvesting using the energy transfer signal 325. The network entity 105-*a* may transmit a third control message 340 in response to a communications scheduling request 320 that indicates scheduling information for communications 330. The UE 115-*b* may expect to use passive circuitry to receive the energy transfer signal 325, to receive or transmit the communications 330, to receive the second control message 335, or to receive the third control message 340.

In some cases, the network entity 105-*a* may schedule another device (e.g., another UE 115) that is spatially closer to the UE 115-*b* to transmit an energy transfer signal to the UE 115-*b*. An energy transfer signal transmitted by a device that is spatially closer to the UE 115-*b* than the network entity 105-*a* may deliver more energy to the UE 115-*b* than an energy transfer signal transmitted by the network entity 105-*a* caused by range constraints of energy transfer signals and energy harvesting. In some cases, the UE 115-*b* may transmit a scheduling request (e.g., an energy scheduling request 315 or a communications scheduling request 320) to a device other than a network entity 105-*a*. For example, the UE 115-b may transmit a scheduling request (e.g., an energy scheduling request 315 or a communications scheduling request 320) to another UE 115 via a sidelink communication link. The other UE 115 may forward the scheduling request received from the UE 115-b to a network entity, and the network entity may transmit a response to the scheduling request (e.g., scheduling information for an energy transfer signal 325 or communications 330) to the UE 115-b either directly or via the other UE 115. In some cases, the other UE 115 may reserve and schedule an energy transfer signal 325 or resources for communications 330 in response to a scheduling request (e.g., an energy scheduling request 315 or a communications scheduling request 320) received from the UE 115-b. For example, the UE 115-b and the other UE may operate in a sidelink mode 2.

The waveform type used for an energy scheduling request 315 or a communications scheduling request 320 may be configured in the control signaling 310 or may be pre-defined. In some cases, the waveform type may be based on a physical random access channel (PRACH) procedure (e.g., a Zadoff-Chu sequence). In some cases, waveform type used for an energy scheduling request 315 or a communications scheduling request 320 may include pre-serving a number of Zadoff-Chu sequences for the UE 115-b. In some cases, an energy scheduling request 315 or a communications scheduling request 320 may be transmitted using PRACH resources for the UE 115-b. In some cases, waveform type used for an energy scheduling request 315 or a communications scheduling request 320 may include a special or dedicated time-domain preamble. In some cases, waveform type used for an energy scheduling request 315 or a communications scheduling request 320 may include a barker code, a Zadoff-Chu sequence, or a constant amplitude zero autocorrelation (CAZAC) waveform.

In some cases, the UE 115-b may repeat transmission of an energy scheduling request 315 or a communications scheduling request 320 for a defined duration if the UE 115-b does not receive a second control message 335 or a third control message 340 in response to the energy scheduling request 315 or the communications scheduling request 320, respectively. In some cases, the duration may be predefined. In some cases, the duration may be configured in the control signaling 310.

In some cases, the UE 115-b may repeat transmission of an energy scheduling request 315 or a communications scheduling request 320 for a defined or fixed number of times if the UE 115-b does not receive a second control message 335 or a third control message 340 in response to the energy scheduling request 315 or the communications scheduling request 320, respectively. In some cases, the defined or fixed number of times may be predefined. In some cases, the defined or fixed number of times may be configured in the control signaling 310.

In some cases, the UE 115-b may repeat transmission of an energy scheduling request 315 or a communications scheduling request 320 after a defined duration if the UE 115-b does not receive a second control message 335 or a third control message 340 in response to the energy scheduling request 315 or the communications scheduling request 320, respectively. In some cases, the defined duration may be predefined. In some cases, the defined duration may be configured in the control signaling 310.

Figure 4:
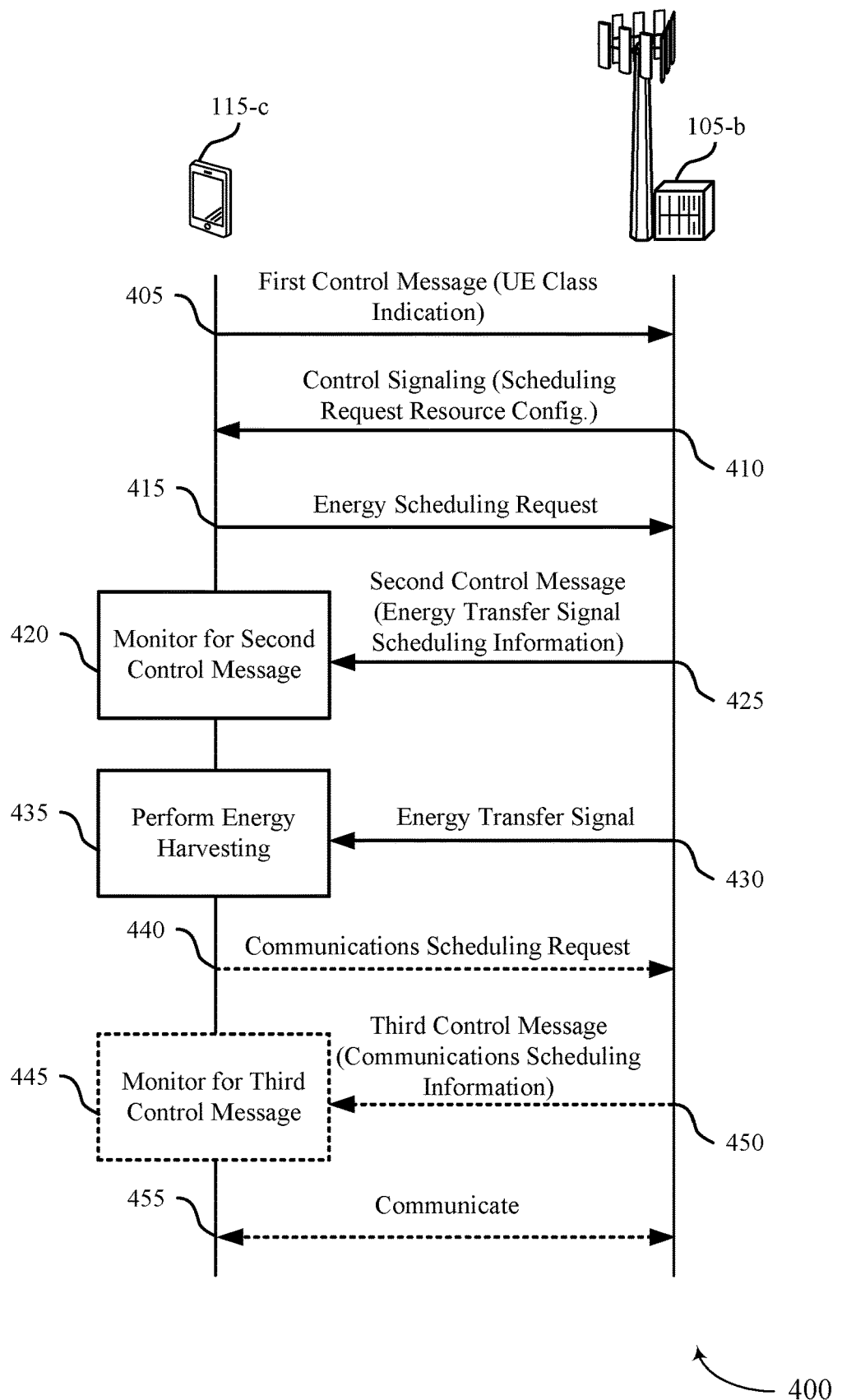
FIG. 4 illustrates an example of a process flow that supports device triggering backscatter communications in accordance with one or more aspects of the present disclosure.

FIG. 4 illustrates an example of a process flow 400 that supports device triggering backscatter communications in accordance with one or more aspects of the present disclosure. The process flow 400 may include a UE 115-c, which may be an example of a UE 115 as described herein. The process flow 400 may include a network entity 105-b, which may be an example of a network entity 105 as described herein. In the following description of the process flow 400, the operations between the network entity 105-b and the UE 115-c may be transmitted in a different order than the example order shown, or the operations performed by the network entity 105-b and the UE 115-c may be performed in different orders or at different times. Some operations may also be omitted from the process flow 400, and other operations may be added to the process flow 400.

At 405, the UE 115-c may transmit, to the network entity 105-b, a first control message indicating a UE class associated with the UE 115-c, where the UE class is associated with energy harvesting. In some cases, the UE class indicated in the first control message at 405 indicates that the UE 115-c includes passive radio circuitry and active radio circuitry.

At 410, the UE 115-c may receive, from the network entity 105-b, control signaling indicating a set of resources for transmitting energy scheduling requests associated with energy harvesting based at least in part on the first control message.

At 415, the UE 115-c may transmit, to the network entity 105-b, an energy scheduling request associated with energy harvesting via the set of resources. In some examples, at 415, the UE 115-c may transmit, with the energy scheduling request, an indication that differentiates the energy scheduling request from a communication scheduling request.

In some cases, transmitting the energy scheduling request at 415 includes transmitting the energy scheduling request using a waveform based on a random access channel preamble. In some cases, transmitting the energy scheduling request at 415 includes transmitting the energy scheduling request using random access channel resources In some cases, transmitting the energy scheduling request at 415 includes transmitting the energy scheduling request using a waveform based on one or more of: a Barker code, a Zadoff-Chu sequence, or a constant amplitude zero autocorrelation waveform.

In some cases, transmitting the energy scheduling request at 415 is based on one or more of a battery state of the UE 115-c, a power input signal strength of the UE 115-c, an energy level for one or more communications tasks at the UE 115-c, or an energy level for one or more sensor tasks at the UE 115-c.

In some cases, the UE 115-c may transition to an energy harvesting state based on transmitting the energy scheduling request at 415.

At 420, the UE 115-c may monitor, based on the energy scheduling request, for a second control message indicating scheduling information for an energy transfer signal.

At 425, the network entity 105-b may transmit, to the UE 115-c based on the energy scheduling request, a second control message indicating scheduling information for an energy transfer signal.

In some cases, the UE 115-c may detect, based on the monitoring at 420, an absence of a response to the energy scheduling request within a fixed time period. The UE 115-c may transmit a second energy scheduling request based on the absence of the response to the energy scheduling request within the fixed time period. In some cases, the UE 115-c may receive an indication of the fixed time period (e.g., with the control signaling at 410).

In some cases, the UE 115-c may repeat transmission of the energy scheduling request up to a fixed number of times until the UE 115-c receives a second control message indicating scheduling information for the energy transfer signal. In some cases, the UE 115-c may receive an indication of the fixed number of times (e.g., with the control signaling at 410).

At 430, the network entity 105-b may transmit an energy transfer signal according to the scheduling information indicated in the second control message at 425.

At 435, the UE 115-c may perform energy harvesting using the energy transfer signal.

In some cases, the control signaling at 410 may indicate a configuration for transmitting a communications scheduling request. For example, the control signaling at 410 may indicate a joint configuration for energy scheduling requests and communication scheduling requests.

In some cases, at 440, the UE 115-c may transmit, to the network entity 105-b in accordance with the joint configuration, a communications scheduling request. In some examples, the UE 115-c may transmit an indication that differentiates the communications scheduling request from the energy scheduling request.

In some cases, the UE 115-c may transition from an active radio state using the active radio circuitry to a passive radio state using the passive radio circuitry based on transmitting the communications scheduling request at 440.

In some cases, at 445, the UE 115-c may monitor, based on the communications scheduling request at 440, for a third control message indicating scheduling information for a data transmission.

In some cases, at 450, the network entity 105-b may transmit, based on the communications scheduling request at 440, a third control message indicating scheduling information for a data transmission.

In some cases, at 455, the network entity 105-b and the UE 115-c may communicate a data transmission in accordance with the scheduling information communicated at 450.

In some cases, at 410, the network entity 105-b may transmit, with the control signaling, an indication of a separate set of resources for transmitting a communications scheduling request. In some cases, at 440, the UE 115-c may transmit, to the network entity 105-b, a communications scheduling request via the separate set of resources. At 445, the UE 115-c may monitor, based on the communications scheduling request at 440, for a third control message indicating scheduling information for a data transmission. At 450, the network entity 105-b may transmit, based on the communications scheduling request at 440, a third control message indicating scheduling information for a data transmission. At 455, the network entity 105-b and the UE 115-c may communicate a data transmission in accordance with the scheduling information communicated at 450.

In some cases, the network entity 105-b may schedule another device (e.g., another UE 115) that is spatially closer to the UE 115-c to transmit an energy transfer signal to the UE 115-c. An energy transfer signal transmitted by a device that is spatially closer to the UE 115-c than the network entity 105-b may deliver more energy to the UE 115-c than an energy transfer signal transmitted by the network entity 105-b caused by range constraints of energy transfer signals and energy harvesting. In some cases, the UE 115-c may transmit a scheduling request (e.g., an energy scheduling request at 415 or a communications scheduling request at 440) to a device other than a network entity 105-b. For example, the UE 115-c may transmit a scheduling request (e.g., an energy scheduling request at 415 or a communications scheduling request at 440) to another UE 115 via a sidelink communication link. The other UE 115 may forward the scheduling request received from the UE 115-c to a network entity, and the network entity may transmit a response to the scheduling request (e.g., an energy scheduling request at 415 or a communications scheduling request at 440) to the UE 115-c either directly or via the other UE 115. In some cases, the other UE 115 may reserve and schedule an energy transfer signal or resources for communications in response to a scheduling request (e.g., an energy scheduling request at 415 or a communications scheduling request at 440) received from the UE 115-c. For example, the UE 115-c and the other UE 115 may operate in a sidelink mode 2.

Figure 5:
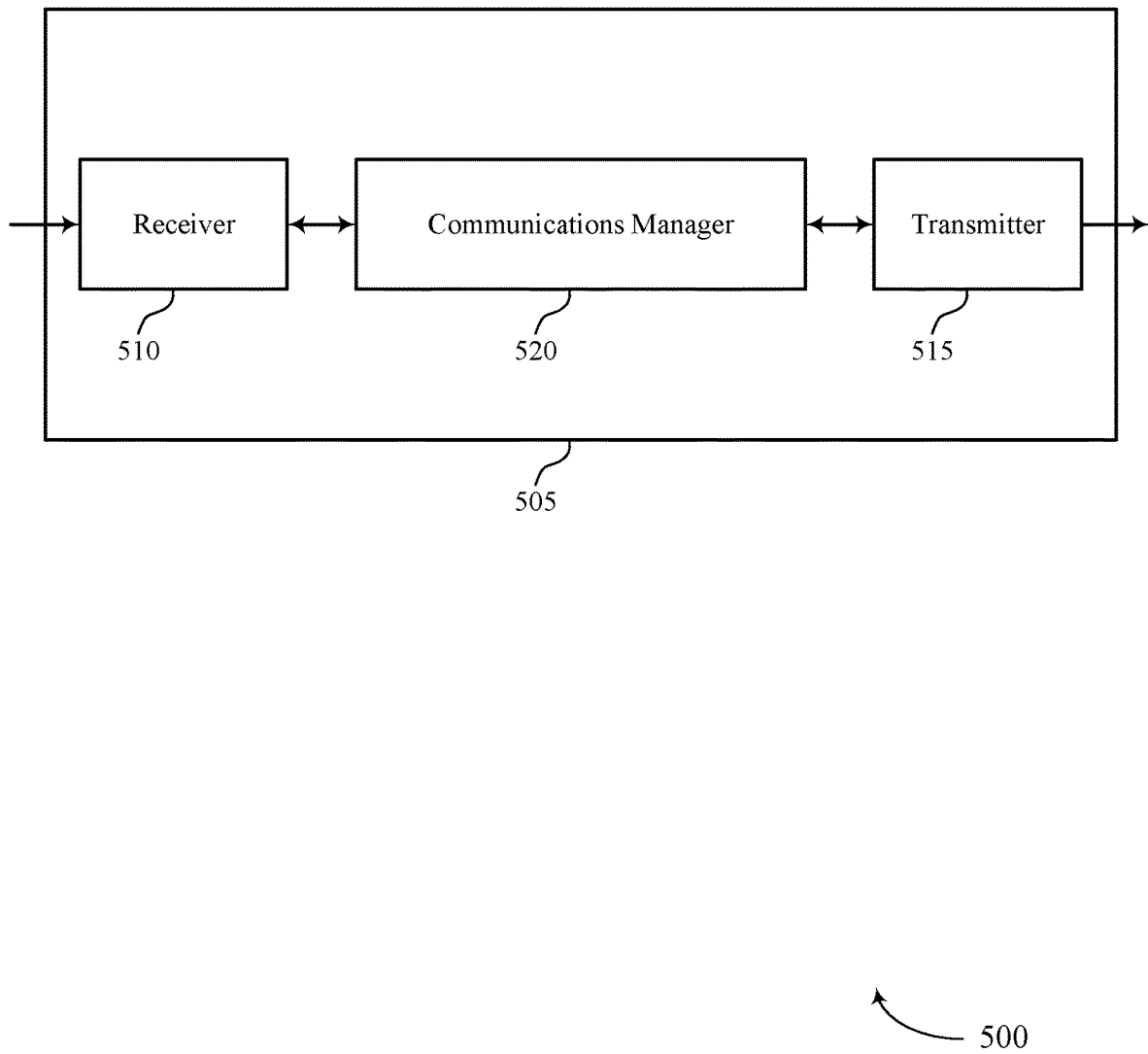
FIGS. 5 and 6 show block diagrams of devices that support device triggering backscatter communications in accordance with one or more aspects of the present disclosure.

FIG. 5 shows a block diagram 500 of a device 505 that supports device triggering backscatter communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to device triggering backscatter communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to device triggering backscatter communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of device triggering backscatter communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry), software (e.g., executed by a processor), or any combination thereof. The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for transmitting a first control message indicating a UE class associated with the UE, where the UE class is associated with energy harvesting. The communications manager 520 may be configured as or otherwise support a means for receiving control signaling indicating a set of resources for transmitting energy scheduling requests associated with energy harvesting based on the first control message. The communications manager 520 may be configured as or otherwise support a means for transmitting an energy scheduling request associated with energy harvesting via the set of resources. The communications manager 520 may be configured as or otherwise support a means for monitoring, based on the energy scheduling request, for a second control message indicating scheduling information for an energy transfer signal.

Figure 6:
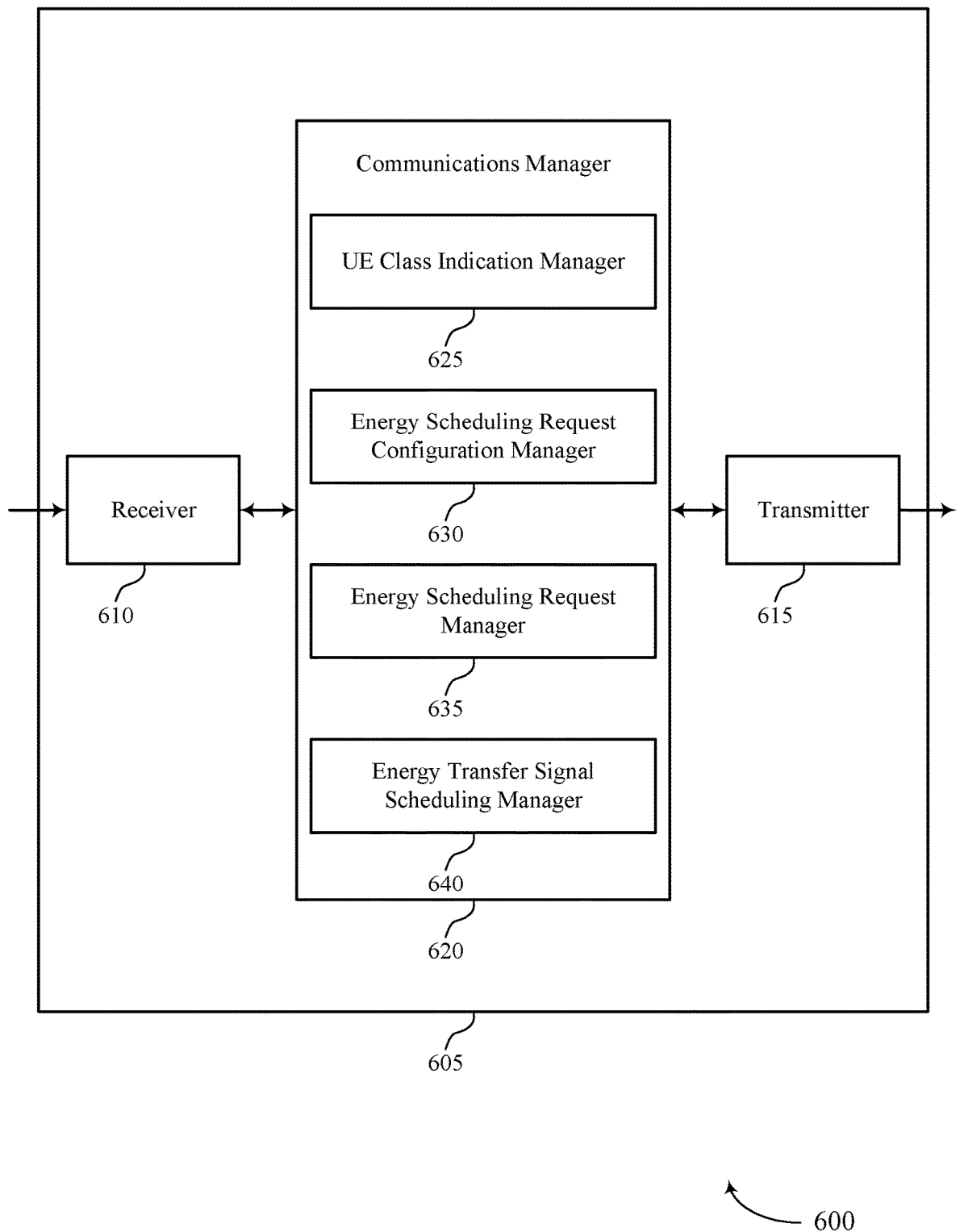

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption and more efficient utilization of communication resources by configuring signaling for energy scheduling requests or communications scheduling requests from a semi-passive UE FIG. 6 shows a block diagram 600 of a device 605 that supports device triggering backscatter communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to device triggering backscatter communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to device triggering backscatter communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of device triggering backscatter communications as described herein. For example, the communications manager 620 may include a UE class indication manager 625, an energy scheduling request configuration manager 630, an energy scheduling request manager 635, an energy transfer signal scheduling manager 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The UE class indication manager 625 may be configured as or otherwise support a means for transmitting a first control message indicating a UE class associated with the UE, where the UE class is associated with energy harvesting. The energy scheduling request configuration manager 630 may be configured as or otherwise support a means for receiving control signaling indicating a set of resources for transmitting energy scheduling requests associated with energy harvesting based on the first control message. The energy scheduling request manager 635 may be configured as or otherwise support a means for transmitting an energy scheduling request associated with energy harvesting via the set of resources. The energy transfer signal scheduling manager 640 may be configured as or otherwise support a means for monitoring, based on the energy scheduling request, for a second control message indicating scheduling information for an energy transfer signal.

Figure 7:
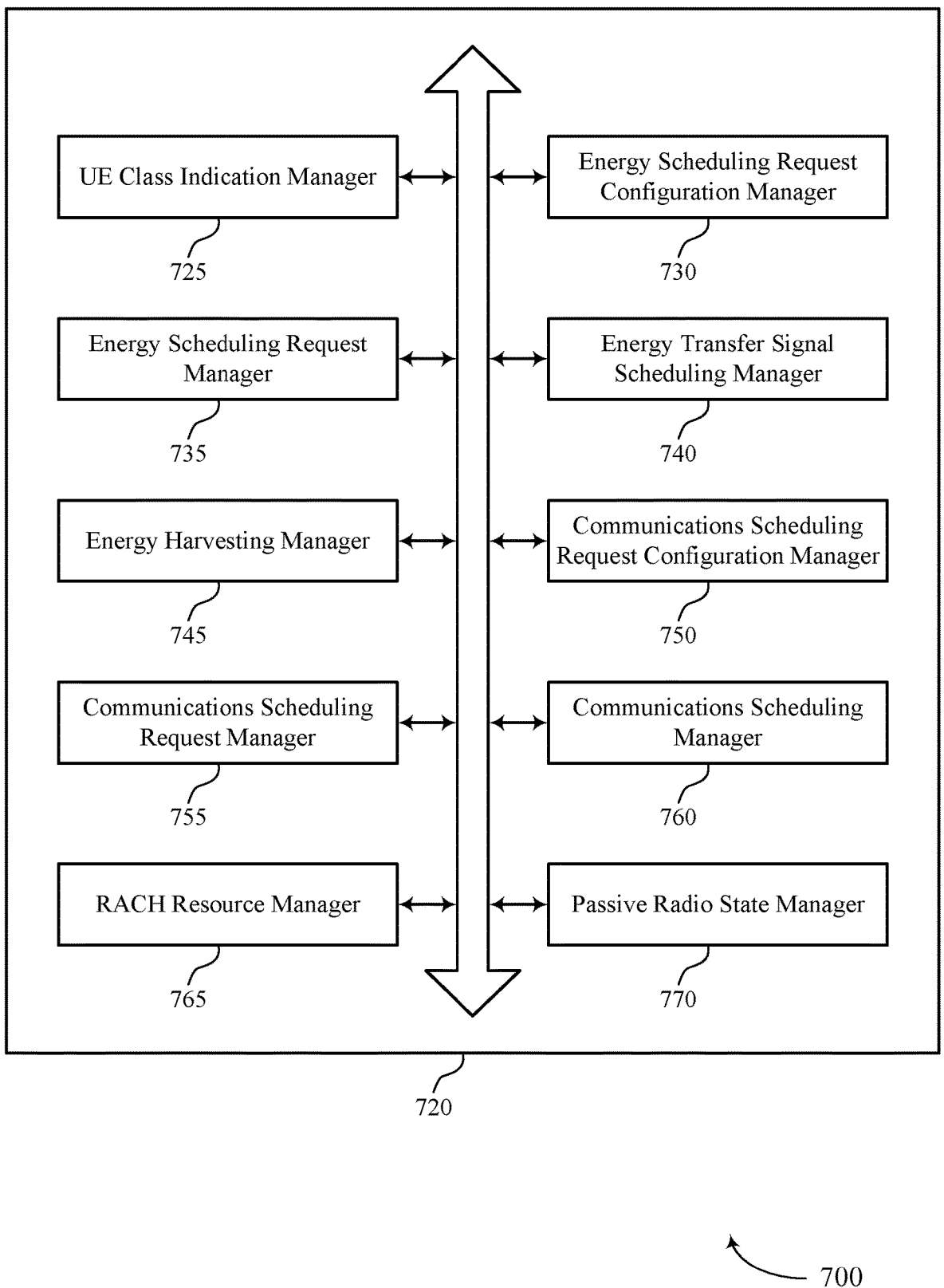
FIG. 7 shows a block diagram of a communications manager that supports device triggering backscatter communications in accordance with one or more aspects of the present disclosure.

FIG. 7 shows a block diagram 700 of a communications manager 720 that supports device triggering backscatter communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of device triggering backscatter communications as described herein. For example, the communications manager 720 may include a UE class indication manager 725, an energy scheduling request configuration manager 730, an energy scheduling request manager 735, an energy transfer signal scheduling manager 740, an energy harvesting manager 745, a communications scheduling request configuration manager 750, a communications scheduling request manager 755, a communications scheduling manager 760, a RACH resource manager 765, a passive radio state manager 770, or any combination thereof. Each of these components may communicate, directly or indirectly, with one another (e.g., via one or more buses).

The communications manager 720 may support wireless communications at a UE in accordance with examples as disclosed herein. The UE class indication manager 725 may be configured as or otherwise support a means for transmitting a first control message indicating a UE class associated with the UE, where the UE class is associated with energy harvesting. The energy scheduling request configuration manager 730 may be configured as or otherwise support a means for receiving control signaling indicating a set of resources for transmitting energy scheduling requests associated with energy harvesting based on the first control message. The energy scheduling request manager 735 may be configured as or otherwise support a means for transmitting an energy scheduling request associated with energy harvesting via the set of resources. The energy transfer signal scheduling manager 740 may be configured as or otherwise support a means for monitoring, based on the energy scheduling request, for a second control message indicating scheduling information for an energy transfer signal.

In some examples, the energy transfer signal scheduling manager 740 may be configured as or otherwise support a means for receiving, based on the monitoring, the second control message indicating the scheduling information for the energy transfer signal. In some examples, the energy harvesting manager 745 may be configured as or otherwise support a means for performing energy harvesting using the energy transfer signal according to the scheduling information.

In some examples, to support transmitting the energy scheduling request, the energy scheduling request manager 735 may be configured as or otherwise support a means for transmitting an indication that differentiates the energy scheduling request from a communication scheduling request.

In some examples, the control signaling indicating the set of resources for transmitting the energy scheduling request indicates a joint configuration for energy scheduling requests and communication scheduling requests.

In some examples, the communications scheduling request manager 755 may be configured as or otherwise support a means for transmitting a communications scheduling request in accordance with the joint configuration. In some examples, the communications scheduling request manager 755 may be configured as or otherwise support a means for transmitting an indication that differentiates the communications scheduling request from the energy scheduling request. In some examples, the communications scheduling manager 760 may be configured as or otherwise support a means for monitoring, based on the communications scheduling request, for a third control message indicating scheduling information for a data transmission.

In some examples, to support transmitting the energy scheduling request, the energy scheduling request manager 735 may be configured as or otherwise support a means for transmitting the energy scheduling request using a waveform based on a random access channel preamble.

In some examples, to support transmitting the energy scheduling request using the waveform based on the random access channel preamble, the RACH resource manager 765 may be configured as or otherwise support a means for transmitting the energy scheduling request using random access channel resources.

In some examples, to support transmitting the energy scheduling request, the energy scheduling request manager 735 may be configured as or otherwise support a means for transmitting the energy scheduling request using a waveform based on one or more of: a Barker code, a Zadoff-Chu sequence, or a constant amplitude zero autocorrelation waveform.

In some examples, the energy transfer signal scheduling manager 740 may be configured as or otherwise support a means for detecting, based on the monitoring, an absence of a response to the energy scheduling request within a fixed time period. In some examples, the energy scheduling request manager 735 may be configured as or otherwise support a means for transmitting a second energy scheduling request based on the absence of the response to the energy scheduling request within the fixed time period.

In some examples, the energy scheduling request manager 735 may be configured as or otherwise support a means for repeating transmission of the energy scheduling request up to a fixed number of times until the UE receives the second control message indicating scheduling information for the energy transfer signal.

In some examples, the energy scheduling request manager 735 may be configured as or otherwise support a means for receiving an indication of the fixed number of times.

In some examples, the communications scheduling request configuration manager 750 may be configured as or otherwise support a means for receiving, with the control signaling, an indication of a separate set of resources for transmitting a communications scheduling request. In some examples, the communications scheduling request manager 755 may be configured as or otherwise support a means for transmitting the communications scheduling request via the separate set of resources. In some examples, the communications scheduling manager 760 may be configured as or otherwise support a means for monitoring, based on the communications scheduling request, for a third control message indicating scheduling information for a data transmission.

In some examples, transmitting the energy scheduling request is based on one or more of a battery state of the UE, a power input signal strength of the UE, an energy level for one or more communications tasks at the UE, or an energy level for one or more sensor tasks at the UE.

In some examples, the UE class indicates that the UE includes passive radio circuitry and active radio circuitry.

In some examples, the energy harvesting manager 745 may be configured as or otherwise support a means for transitioning to an energy harvesting state based on transmitting the energy scheduling request.

In some examples, the communications scheduling request manager 755 may be configured as or otherwise support a means for transmitting a communications scheduling request. In some examples, the passive radio state manager 770 may be configured as or otherwise support a means for transitioning from an active radio state using the active radio circuitry to a passive radio state using the passive radio circuitry based at least in part on transmitting the communications scheduling request.

Figure 8:
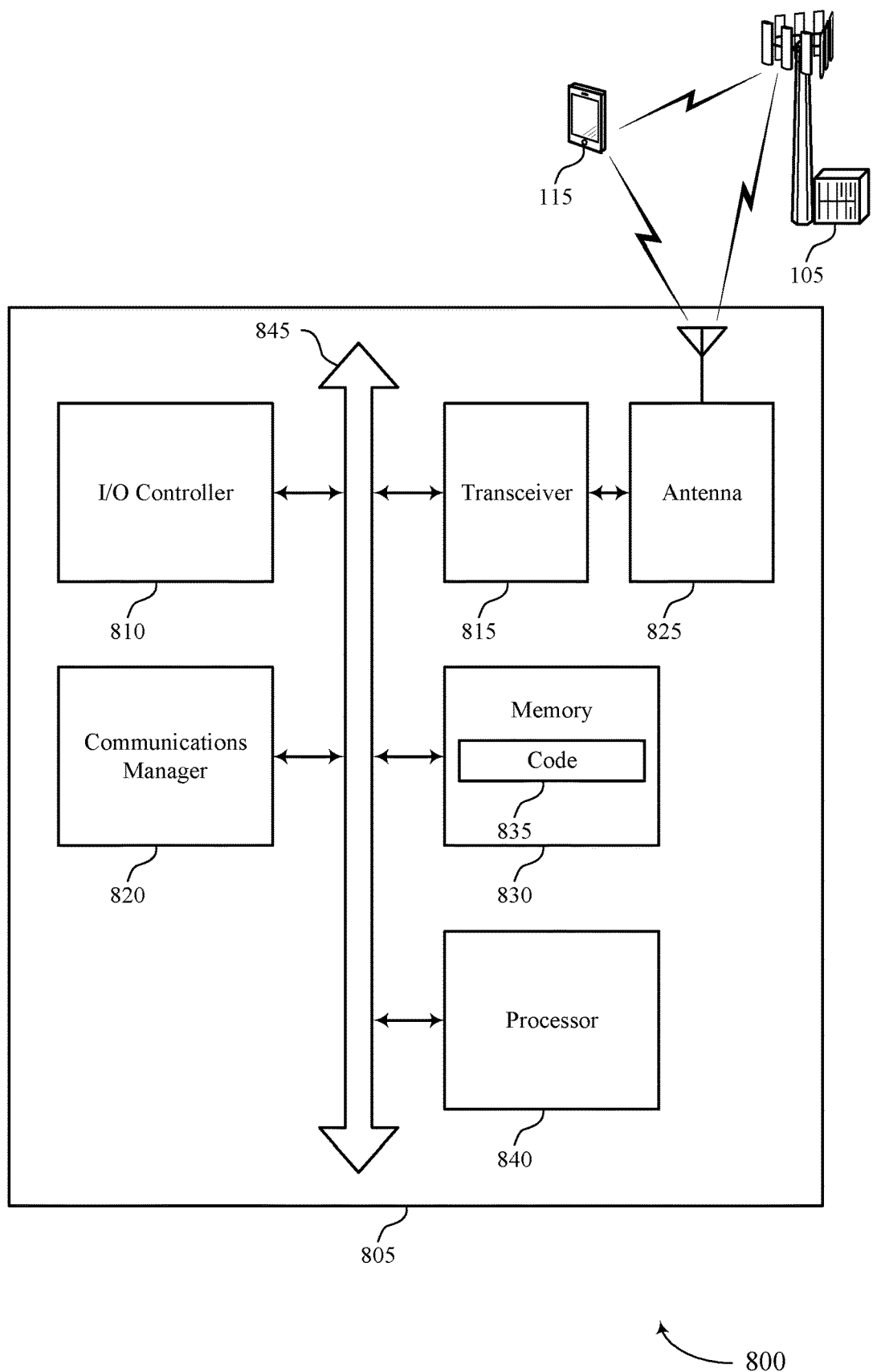
FIG. 8 shows a diagram of a system including a device that supports device triggering backscatter communications in accordance with one or more aspects of the present disclosure.

FIG. 8 shows a diagram of a system 800 including a device 805 that supports device triggering backscatter communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting device triggering backscatter communications). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting a first control message indicating a UE class associated with the UE, where the UE class is associated with energy harvesting. The communications manager 820 may be configured as or otherwise support a means for receiving control signaling indicating a set of resources for transmitting energy scheduling requests associated with energy harvesting based on the first control message. The communications manager 820 may be configured as or otherwise support a means for transmitting an energy scheduling request associated with energy harvesting via the set of resources. The communications manager 820 may be configured as or otherwise support a means for monitoring, based on the energy scheduling request, for a second control message indicating scheduling information for an energy transfer signal.

By including or configuring the communications manager 820 in accordance with examples as described herein, the device 805 may support techniques for improved communication reliability, reduced power consumption, more efficient utilization of communication resources, improved coordination between devices, longer battery life, and improved utilization of processing capability by configuring signaling for energy scheduling requests or communications scheduling requests from a semi-passive UE.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of device triggering backscatter communications as described herein, or the processor 840 and the memory 830 may be otherwise configured to perform or support such operations.

Figure 9:
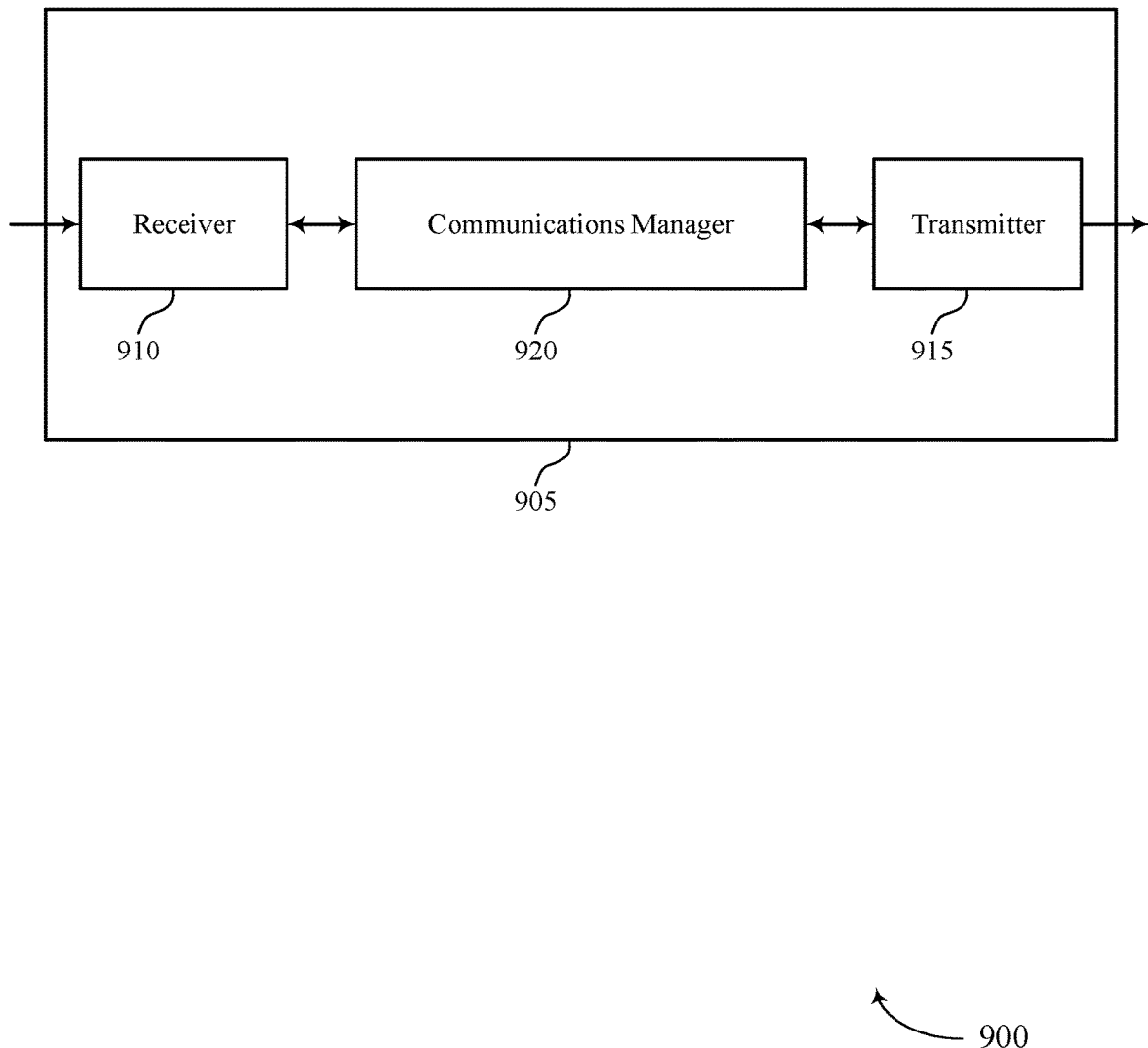
FIGS. 9 and 10 show block diagrams of devices that support device triggering backscatter communications in accordance with one or more aspects of the present disclosure.

FIG. 9 shows a block diagram 900 of a device 905 that supports device triggering backscatter communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of device triggering backscatter communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for receiving, from a UE, a first control message indicating a UE class associated with the UE, where the UE class is associated with energy harvesting. The communications manager 920 may be configured as or otherwise support a means for transmitting, to the UE, control signaling indicating a set of resources for transmitting an energy scheduling requests associated with energy harvesting based on the first control message. The communications manager 920 may be configured as or otherwise support a means for receiving, from the UE, an energy scheduling request associated with energy harvesting via the set of resources. The communications manager 920 may be configured as or otherwise support a means for transmitting, to the UE based on the energy scheduling request, a second control message indicating scheduling information for an energy transfer signal.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption and more efficient utilization of communication resources by configuring signaling for energy scheduling requests or communications scheduling requests from a semi-passive UE.

Figure 10:
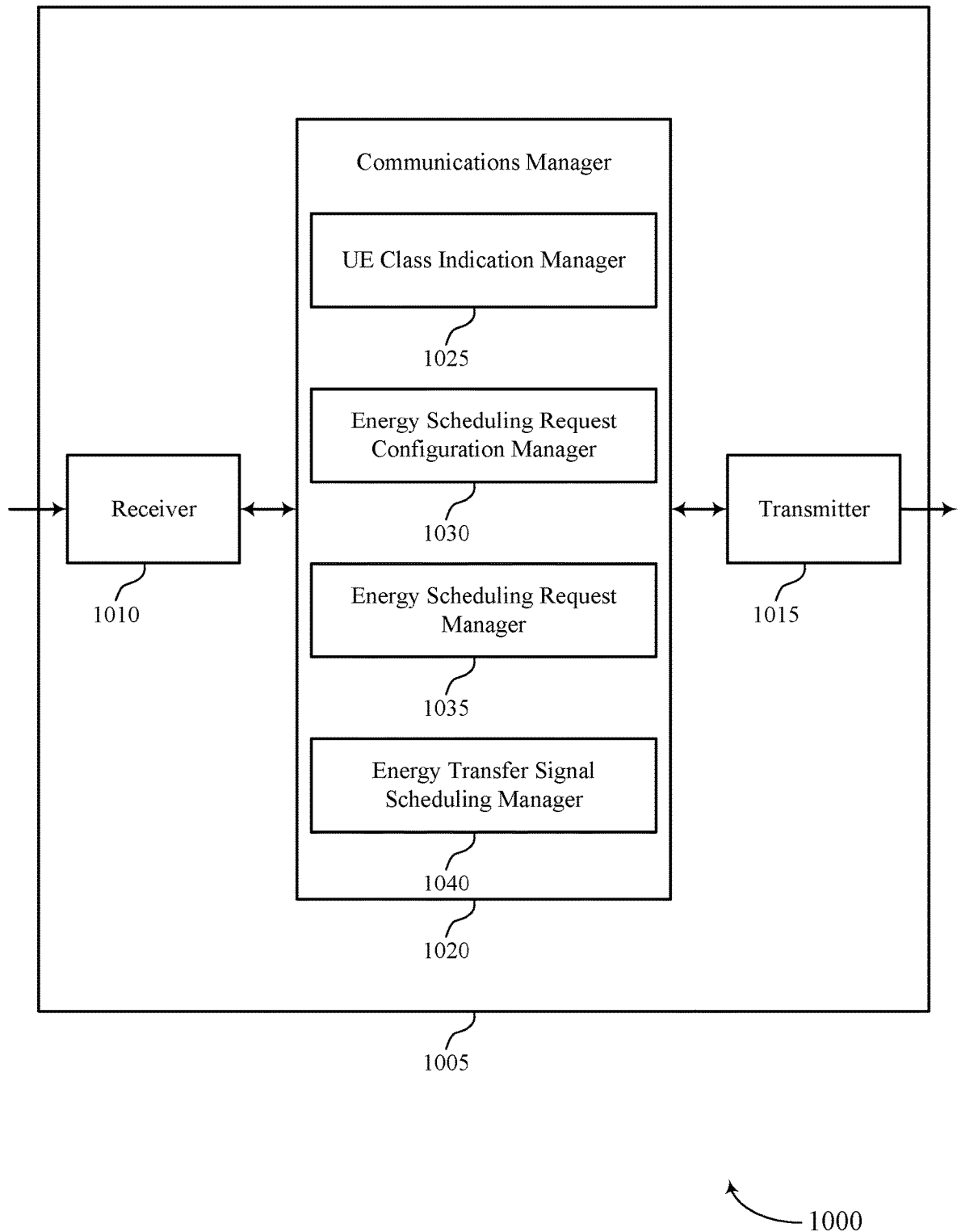

FIG. 10 shows a block diagram 1000 of a device 1005 that supports device triggering backscatter communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of device triggering backscatter communications as described herein. For example, the communications manager 1020 may include a UE class indication manager 1025, an energy scheduling request configuration manager 1030, an energy scheduling request manager 1035, an energy transfer signal scheduling manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The UE class indication manager 1025 may be configured as or otherwise support a means for receiving, from a UE, a first control message indicating a UE class associated with the UE, where the UE class is associated with energy harvesting. The energy scheduling request configuration manager 1030 may be configured as or otherwise support a means for transmitting, to the UE, control signaling indicating a set of resources for transmitting an energy scheduling requests associated with energy harvesting based on the first control message. The energy scheduling request manager 1035 may be configured as or otherwise support a means for receiving, from the UE, an energy scheduling request associated with energy harvesting via the set of resources. The energy transfer signal scheduling manager 1040 may be configured as or otherwise support a means for transmitting, to the UE based on the energy scheduling request, a second control message indicating scheduling information for an energy transfer signal.

Figure 11:
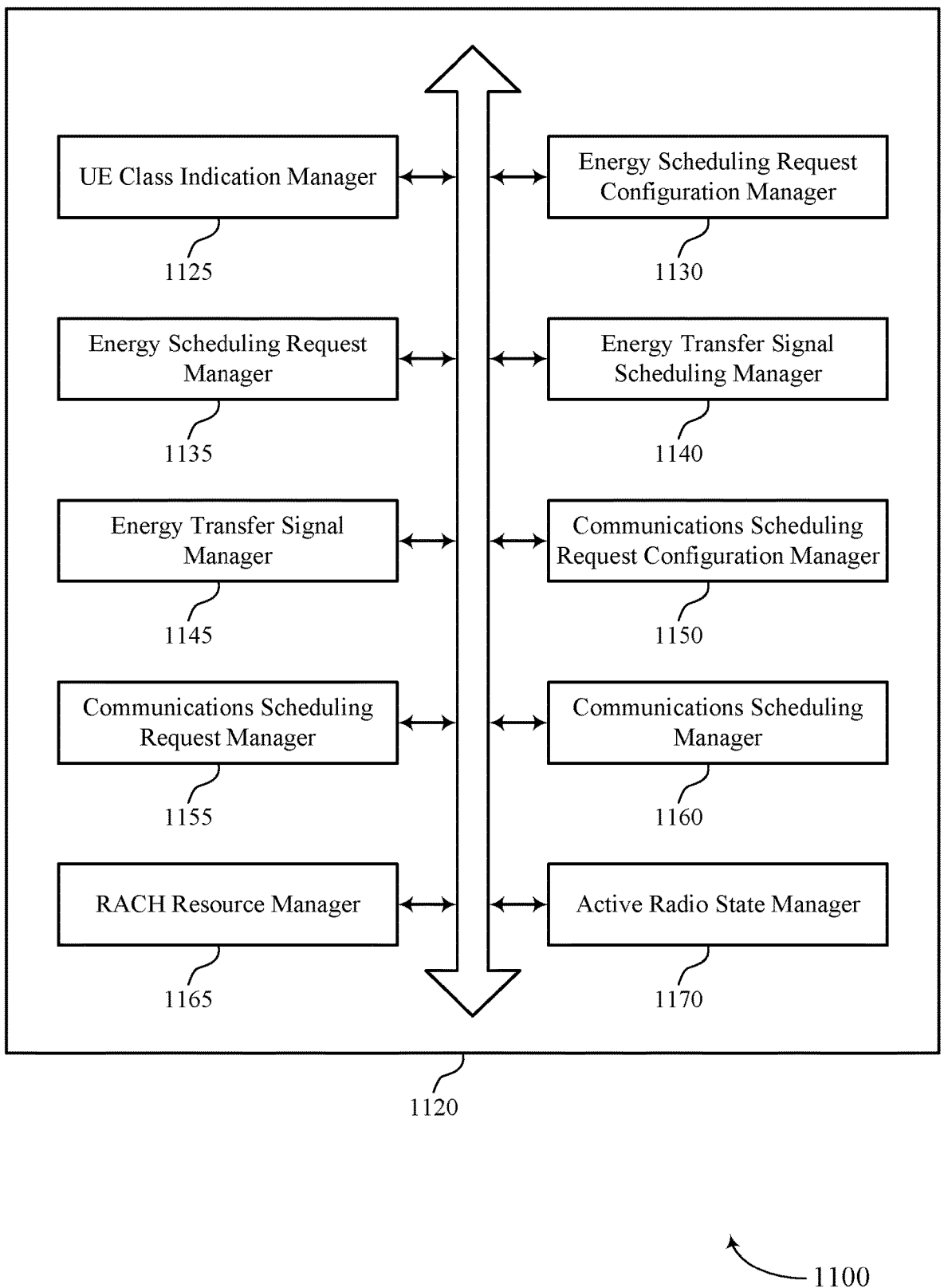
FIG. 11 shows a block diagram of a communications manager that supports device triggering backscatter communications in accordance with one or more aspects of the present disclosure.

FIG. 11 shows a block diagram 1100 of a communications manager 1120 that supports device triggering backscatter communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of device triggering backscatter communications as described herein. For example, the communications manager 1120 may include a UE class indication manager 1125, an energy scheduling request configuration manager 1130, an energy scheduling request manager 1135, an energy transfer signal scheduling manager 1140, an energy transfer signal manager 1145, a communications scheduling request configuration manager 1150, a communications scheduling request manager 1155, a communications scheduling manager 1160, a RACH resource manager 1165, an active radio state manager 1170, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The UE class indication manager 1125 may be configured as or otherwise support a means for receiving, from a UE, a first control message indicating a UE class associated with the UE, where the UE class is associated with energy harvesting. The energy scheduling request configuration manager 1130 may be configured as or otherwise support a means for transmitting, to the UE, control signaling indicating a set of resources for transmitting an energy scheduling requests associated with energy harvesting based on the first control message. The energy scheduling request manager 1135 may be configured as or otherwise support a means for receiving, from the UE, an energy scheduling request associated with energy harvesting via the set of resources. The energy transfer signal scheduling manager 1140 may be configured as or otherwise support a means for transmitting, to the UE based on the energy scheduling request, a second control message indicating scheduling information for an energy transfer signal.

In some examples, the energy transfer signal manager 1145 may be configured as or otherwise support a means for transmitting the energy transfer signal according to the scheduling information.

In some examples, to support receiving the energy scheduling request, the energy scheduling request manager 1135 may be configured as or otherwise support a means for receiving an indication that differentiates the energy scheduling request from a communication scheduling request.

In some examples, the control signaling indicating the set of resources for transmitting the energy scheduling request indicates a joint configuration for energy scheduling requests and communication scheduling requests.

In some examples, the communications scheduling request manager 1155 may be configured as or otherwise support a means for receiving a communications scheduling request in accordance with the joint configuration. In some examples, the communications scheduling request manager 1155 may be configured as or otherwise support a means for receiving an indication that differentiates the communications scheduling request from the energy scheduling request. In some examples, the communications scheduling manager 1160 may be configured as or otherwise support a means for transmitting, based on the communications scheduling request, a third control message indicating scheduling information for a data transmission.

In some examples, to support receiving the energy scheduling request, the energy scheduling request manager 1135 may be configured as or otherwise support a means for receiving the energy scheduling request using a waveform based on a random access channel preamble.

In some examples, to support receiving the energy scheduling request using the waveform based on the random access channel preamble, the RACH resource manager 1165 may be configured as or otherwise support a means for receiving the energy scheduling request using random access channel resources.

In some examples, to support receiving the energy scheduling request, the energy scheduling request manager 1135 may be configured as or otherwise support a means for receiving the energy scheduling request using a waveform based on one or more of: a Barker code, a Zadoff-Chu sequence, or a constant amplitude zero autocorrelation waveform.

In some examples, the energy transfer signal scheduling manager 1140 may be configured as or otherwise support a means for transmitting, to the UE, an indication of a fixed number of times to repeat transmission of the energy scheduling request.

In some examples, the communications scheduling request configuration manager 1150 may be configured as or otherwise support a means for transmitting, with the control signaling, an indication of a separate set of resources for transmitting a communications scheduling request. In some examples, the communications scheduling request manager 1155 may be configured as or otherwise support a means for receiving, from the UE, the communications scheduling request via the separate set of resources. In some examples, the communications scheduling manager 1160 may be configured as or otherwise support a means for transmitting, based on the communications scheduling request, a third control message indicating scheduling information for a data transmission.

In some examples, the UE class indicates that the UE includes passive radio circuitry and active radio circuitry.

In some examples, the active radio state manager 1170 may be configured as or otherwise support a means for transitioning from a listening state to an active radio state based on receiving the energy scheduling request.

Figure 12:
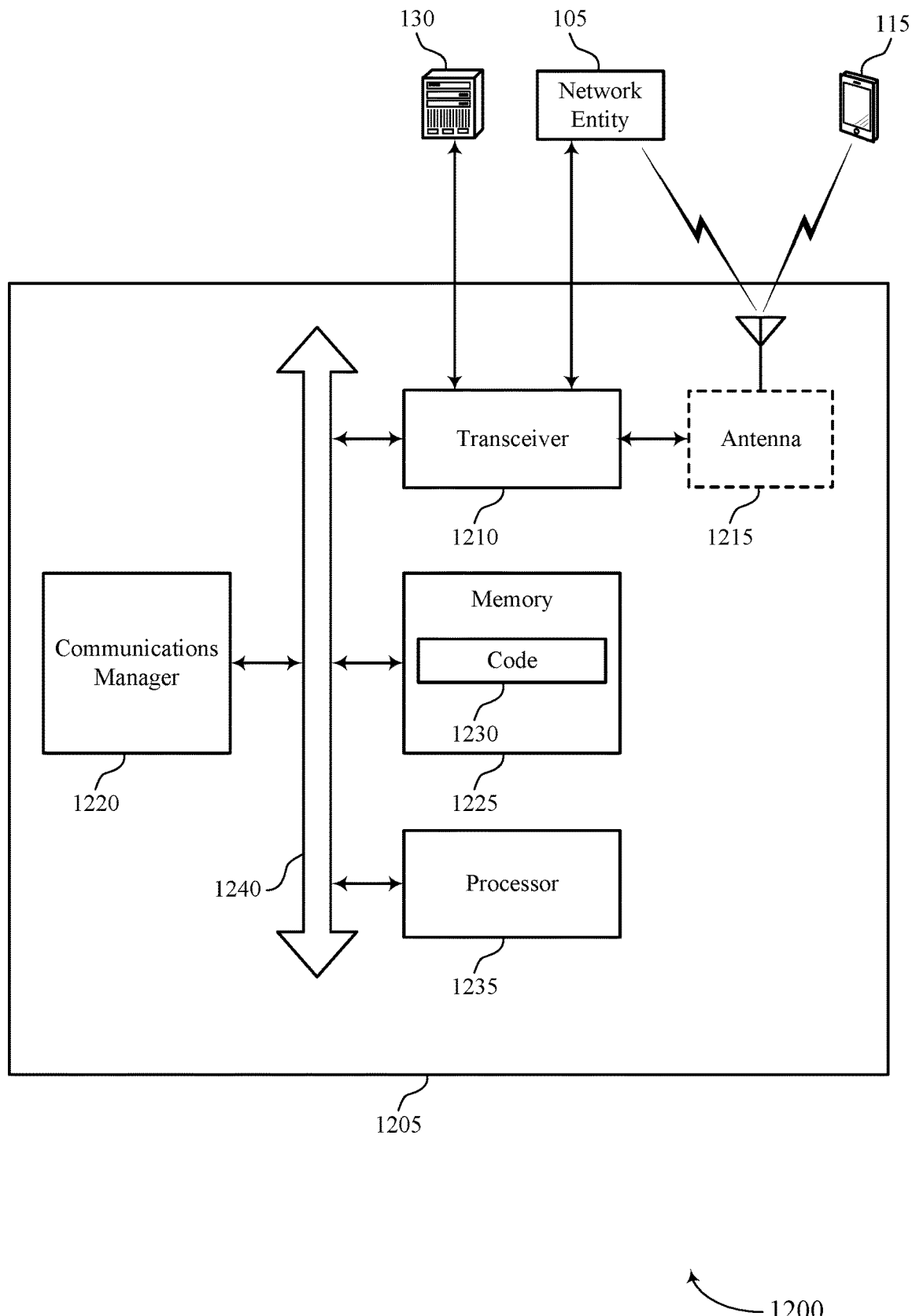
FIG. 12 shows a diagram of a system including a device that supports device triggering backscatter communications in accordance with one or more aspects of the present disclosure.

FIG. 12 shows a diagram of a system 1200 including a device 1205 that supports device triggering backscatter communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a GPU, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting device triggering backscatter communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for receiving, from a UE, a first control message indicating a UE class associated with the UE, where the UE class is associated with energy harvesting. The communications manager 1220 may be configured as or otherwise support a means for transmitting, to the UE, control signaling indicating a set of resources for transmitting an energy scheduling requests associated with energy harvesting based on the first control message. The communications manager 1220 may be configured as or otherwise support a means for receiving, from the UE, an energy scheduling request associated with energy harvesting via the set of resources. The communications manager 1220 may be configured as or otherwise support a means for transmitting, to the UE based on the energy scheduling request, a second control message indicating scheduling information for an energy transfer signal.

By including or configuring the communications manager 1220 in accordance with examples as described herein, the device 1205 may support techniques for improved communication reliability, reduced power consumption, more efficient utilization of communication resources, improved coordination between devices, longer battery life, and improved utilization of processing capability by configuring signaling for energy scheduling requests or communications scheduling requests from a semi-passive UE.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of device triggering backscatter communications as described herein, or the processor 1235 and the memory 1225 may be otherwise configured to perform or support such operations.

Figure 13:
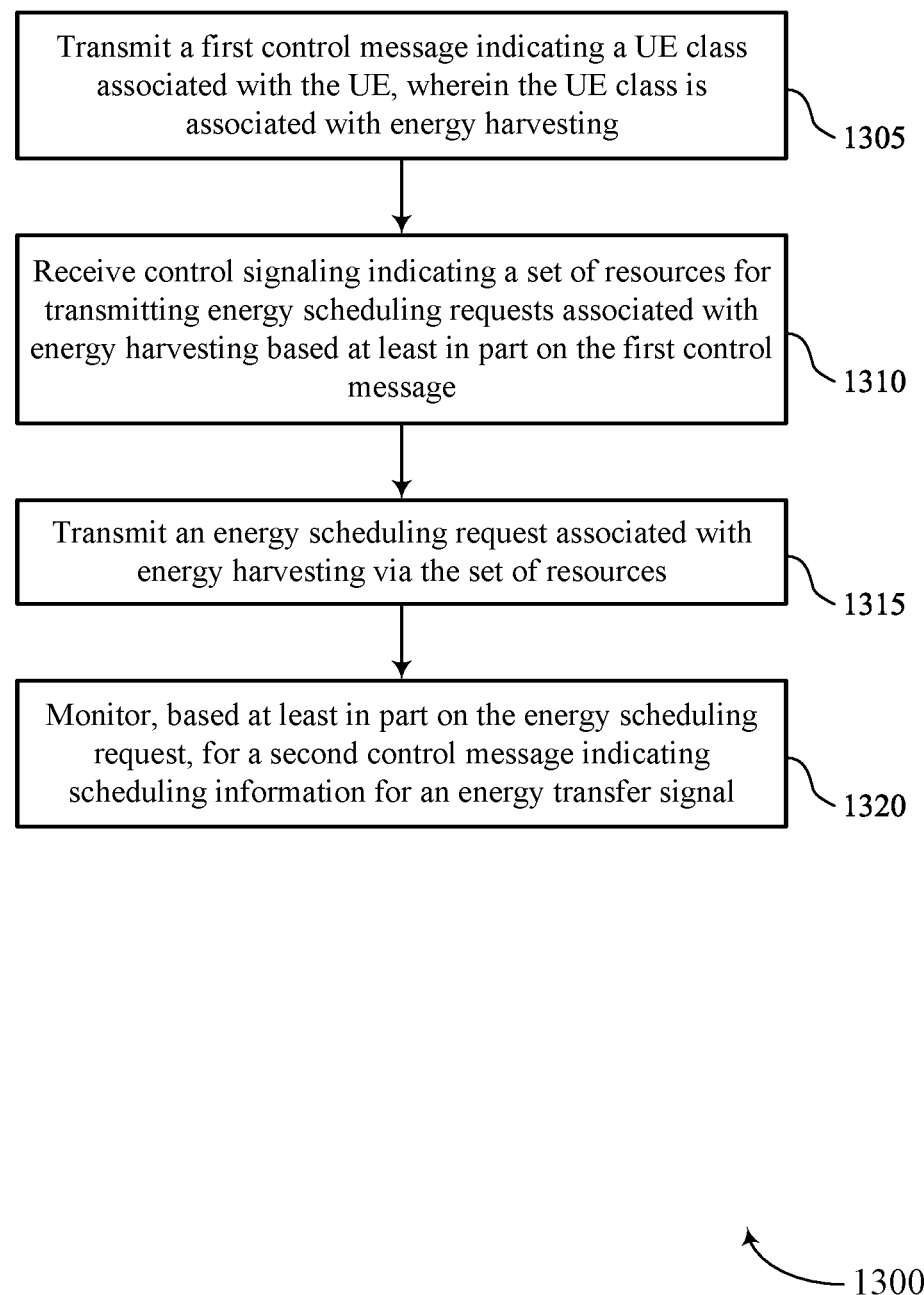
FIGS. 13 through 18 show flowcharts illustrating methods that support device triggering backscatter communications in accordance with one or more aspects of the present disclosure.

FIG. 13 shows a flowchart illustrating a method 1300 that supports device triggering backscatter communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a first control message indicating a UE class associated with the UE, wherein the UE class is associated with energy harvesting. The operations of 1305 may be performed in accordance with examples as disclosed herein. In some examples, aspects of the operations of 1305 may be performed by a UE class indication manager 725 as described with reference to FIG. 7.

At 1310, the method may include receiving control signaling indicating a set of resources for transmitting energy scheduling requests associated with energy harvesting based at least in part on the first control message. The operations of 1310 may be performed in accordance with examples as disclosed herein. In some examples, aspects of the operations of 1310 may be performed by an energy scheduling request configuration manager 730 as described with reference to FIG. 7.

At 1315, the method may include transmitting an energy scheduling request associated with energy harvesting via the set of resources. The operations of 1315 may be performed in accordance with examples as disclosed herein. In some examples, aspects of the operations of 1315 may be performed by an energy scheduling request manager 735 as described with reference to FIG. 7.

At 1320, the method may include monitoring, based at least in part on the energy scheduling request, for a second control message indicating scheduling information for an energy transfer signal. The operations of 1320 may be performed in accordance with examples as disclosed herein. In some examples, aspects of the operations of 1320 may be performed by an energy transfer signal scheduling manager 740 as described with reference to FIG. 7.

Figure 14:
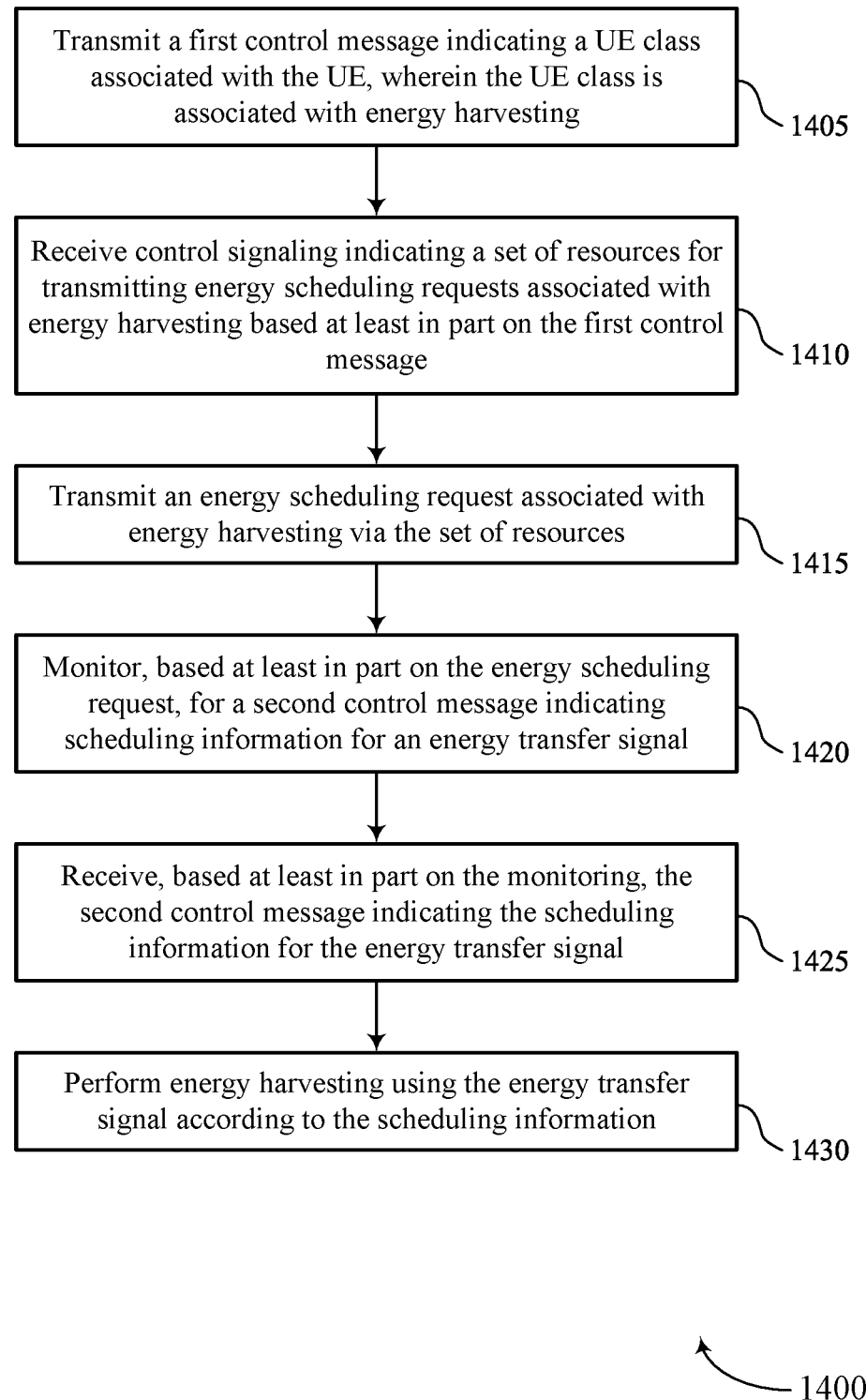

FIG. 14 shows a flowchart illustrating a method 1400 that supports device triggering backscatter communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a first control message indicating a UE class associated with the UE, wherein the UE class is associated with energy harvesting. The operations of 1405 may be performed in accordance with examples as disclosed herein. In some examples, aspects of the operations of 1405 may be performed by a UE class indication manager 725 as described with reference to FIG. 7.

At 1410, the method may include receiving control signaling indicating a set of resources for transmitting energy scheduling requests associated with energy harvesting based at least in part on the first control message. The operations of 1410 may be performed in accordance with examples as disclosed herein. In some examples, aspects of the operations of 1410 may be performed by an energy scheduling request configuration manager 730 as described with reference to FIG. 7.

At 1415, the method may include transmitting an energy scheduling request associated with energy harvesting via the set of resources. The operations of 1415 may be performed in accordance with examples as disclosed herein. In some examples, aspects of the operations of 1415 may be performed by an energy scheduling request manager 735 as described with reference to FIG. 7.

At 1420, the method may include monitoring, based at least in part on the energy scheduling request, for a second control message indicating scheduling information for an energy transfer signal. The operations of 1420 may be performed in accordance with examples as disclosed herein. In some examples, aspects of the operations of 1420 may be performed by an energy transfer signal scheduling manager 740 as described with reference to FIG. 7.

At 1425, the method may include receiving, based at least in part on the monitoring, the second control message indicating the scheduling information for the energy transfer signal. The operations of 1425 may be performed in accordance with examples as disclosed herein. In some examples, aspects of the operations of 1425 may be performed by an energy transfer signal scheduling manager 740 as described with reference to FIG. 7.

At 1430, the method may include performing energy harvesting using the energy transfer signal according to the scheduling information. The operations of 1430 may be performed in accordance with examples as disclosed herein. In some examples, aspects of the operations of 1430 may be performed by an energy harvesting manager 745 as described with reference to FIG. 7.

Figure 15:
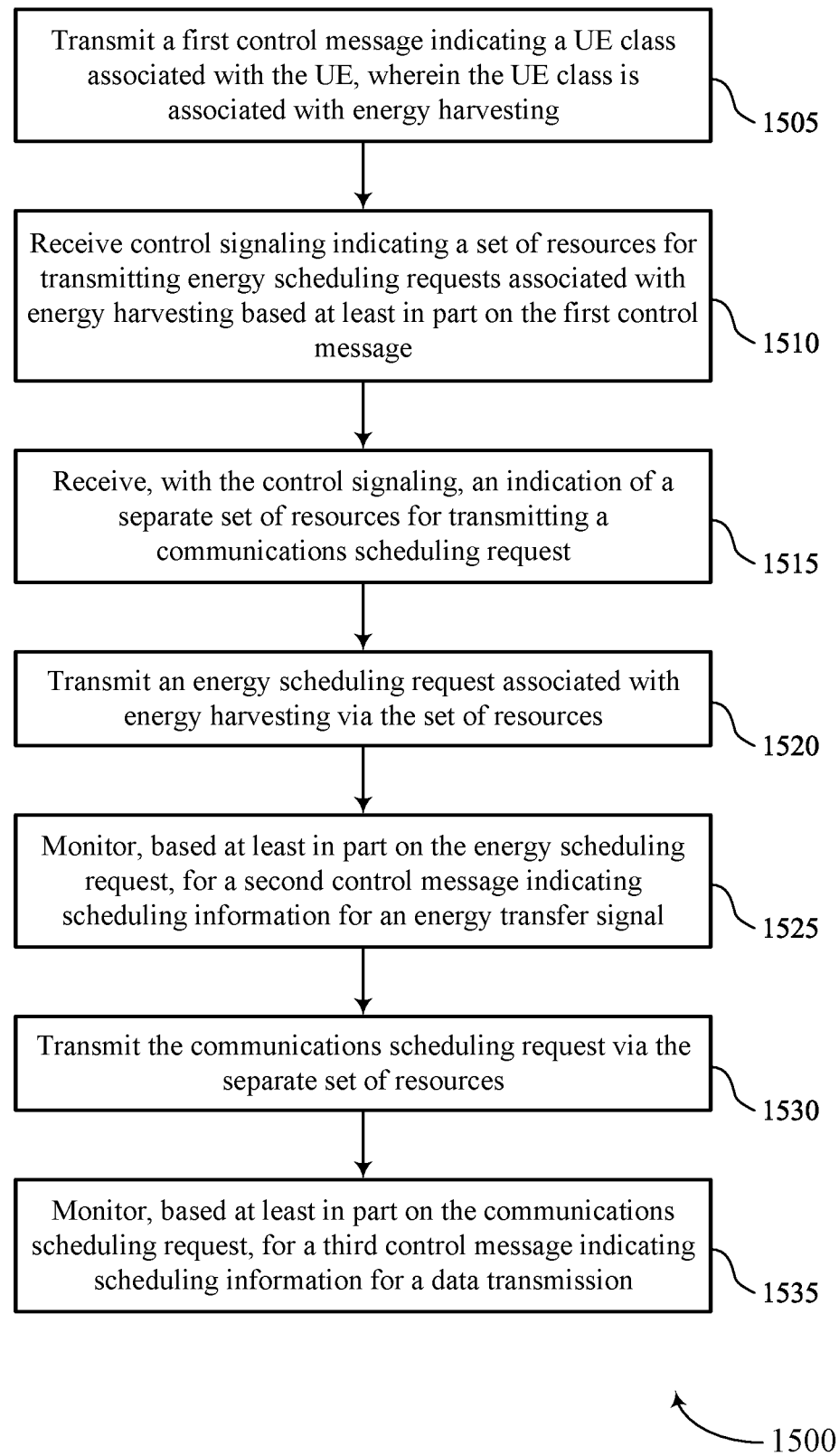

FIG. 15 shows a flowchart illustrating a method 1500 that supports device triggering backscatter communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting a first control message indicating a UE class associated with the UE, wherein the UE class is associated with energy harvesting. The operations of 1505 may be performed in accordance with examples as disclosed herein. In some examples, aspects of the operations of 1505 may be performed by a UE class indication manager 725 as described with reference to FIG. 7.

At 1510, the method may include receiving control signaling indicating a set of resources for transmitting energy scheduling requests associated with energy harvesting based at least in part on the first control message. The operations of 1510 may be performed in accordance with examples as disclosed herein. In some examples, aspects of the operations of 1510 may be performed by an energy scheduling request configuration manager 730 as described with reference to FIG. 7.

At 1515, the method may include receiving, with the control signaling, an indication of a separate set of resources for transmitting a communications scheduling request. The operations of 1515 may be performed in accordance with examples as disclosed herein. In some examples, aspects of the operations of 1515 may be performed by a communications scheduling request configuration manager 750 as described with reference to FIG. 7.

At 1520, the method may include transmitting an energy scheduling request associated with energy harvesting via the set of resources. The operations of 1520 may be performed in accordance with examples as disclosed herein. In some examples, aspects of the operations of 1520 may be performed by an energy scheduling request manager 735 as described with reference to FIG. 7.

At 1525, the method may include monitoring, based at least in part on the energy scheduling request, for a second control message indicating scheduling information for an energy transfer signal. The operations of 1525 may be performed in accordance with examples as disclosed herein. In some examples, aspects of the operations of 1525 may be performed by an energy transfer signal scheduling manager 740 as described with reference to FIG. 7.

At 1530, the method may include transmitting the communications scheduling request via the separate set of resources. The operations of 1530 may be performed in accordance with examples as disclosed herein. In some examples, aspects of the operations of 1530 may be performed by a communications scheduling request manager 755 as described with reference to FIG. 7.

At 1535, the method may include monitoring, based at least in part on the communications scheduling request, for a third control message indicating scheduling information for a data transmission. The operations of 1535 may be performed in accordance with examples as disclosed herein. In some examples, aspects of the operations of 1535 may be performed by a communications scheduling manager 760 as described with reference to FIG. 7.

Figure 16:
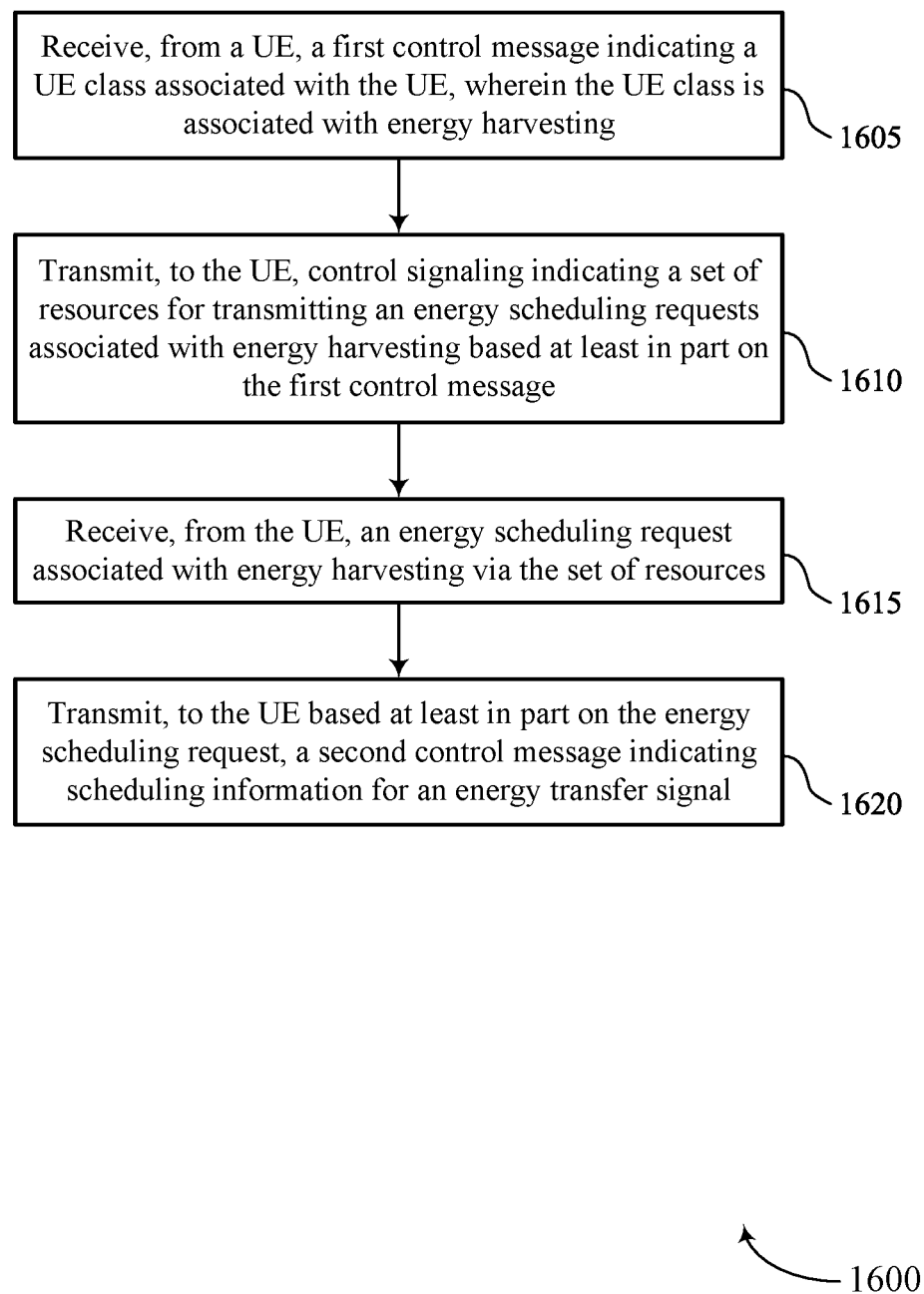

FIG. 16 shows a flowchart illustrating a method 1600 that supports device triggering backscatter communications in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE, a first control message indicating a UE class associated with the UE, wherein the UE class is associated with energy harvesting. The operations of 1605 may be performed in accordance with examples as disclosed herein. In some examples, aspects of the operations of 1605 may be performed by a UE class indication manager 1125 as described with reference to FIG. 11.

At 1610, the method may include transmitting, to the UE, control signaling indicating a set of resources for transmitting an energy scheduling requests associated with energy harvesting based at least in part on the first control message. The operations of 1610 may be performed in accordance with examples as disclosed herein. In some examples, aspects of the operations of 1610 may be performed by an energy scheduling request configuration manager 1130 as described with reference to FIG. 11.

At 1615, the method may include receiving, from the UE, an energy scheduling request associated with energy harvesting via the set of resources. The operations of 1615 may be performed in accordance with examples as disclosed herein. In some examples, aspects of the operations of 1615 may be performed by an energy scheduling request manager 1135 as described with reference to FIG. 11.

At 1620, the method may include transmitting, to the UE based at least in part on the energy scheduling request, a second control message indicating scheduling information for an energy transfer signal. The operations of 1620 may be performed in accordance with examples as disclosed herein.

In some examples, aspects of the operations of 1620 may be performed by an energy transfer signal scheduling manager 1140 as described with reference to FIG. 11.

Figure 17:
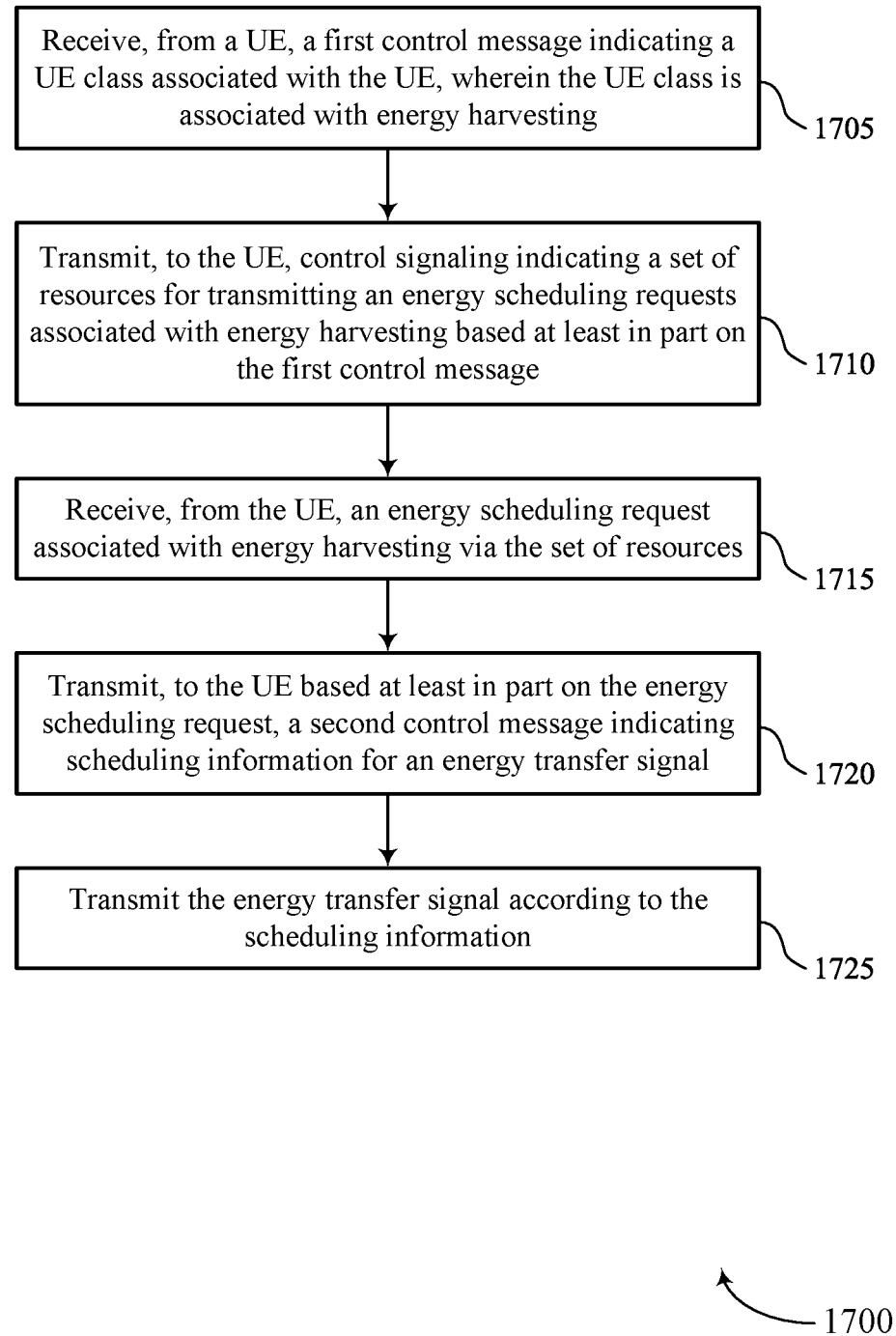

FIG. 17 shows a flowchart illustrating a method 1700 that supports device triggering backscatter communications in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a UE, a first control message indicating a UE class associated with the UE, wherein the UE class is associated with energy harvesting. The operations of 1705 may be performed in accordance with examples as disclosed herein. In some examples, aspects of the operations of 1705 may be performed by a UE class indication manager 1125 as described with reference to FIG. 11.

At 1710, the method may include transmitting, to the UE, control signaling indicating a set of resources for transmitting an energy scheduling requests associated with energy harvesting based at least in part on the first control message. The operations of 1710 may be performed in accordance with examples as disclosed herein. In some examples, aspects of the operations of 1710 may be performed by an energy scheduling request configuration manager 1130 as described with reference to FIG. 11.

At 1715, the method may include receiving, from the UE, an energy scheduling request associated with energy harvesting via the set of resources. The operations of 1715 may be performed in accordance with examples as disclosed herein. In some examples, aspects of the operations of 1715 may be performed by an energy scheduling request manager 1135 as described with reference to FIG. 11.

At 1720, the method may include transmitting, to the UE based at least in part on the energy scheduling request, a second control message indicating scheduling information for an energy transfer signal. The operations of 1720 may be performed in accordance with examples as disclosed herein. In some examples, aspects of the operations of 1720 may be performed by an energy transfer signal scheduling manager 1140 as described with reference to FIG. 11.

At 1725, the method may include transmitting the energy transfer signal according to the scheduling information. The operations of 1725 may be performed in accordance with examples as disclosed herein. In some examples, aspects of the operations of 1725 may be performed by an energy transfer signal manager 1145 as described with reference to FIG. 11.

Figure 18:
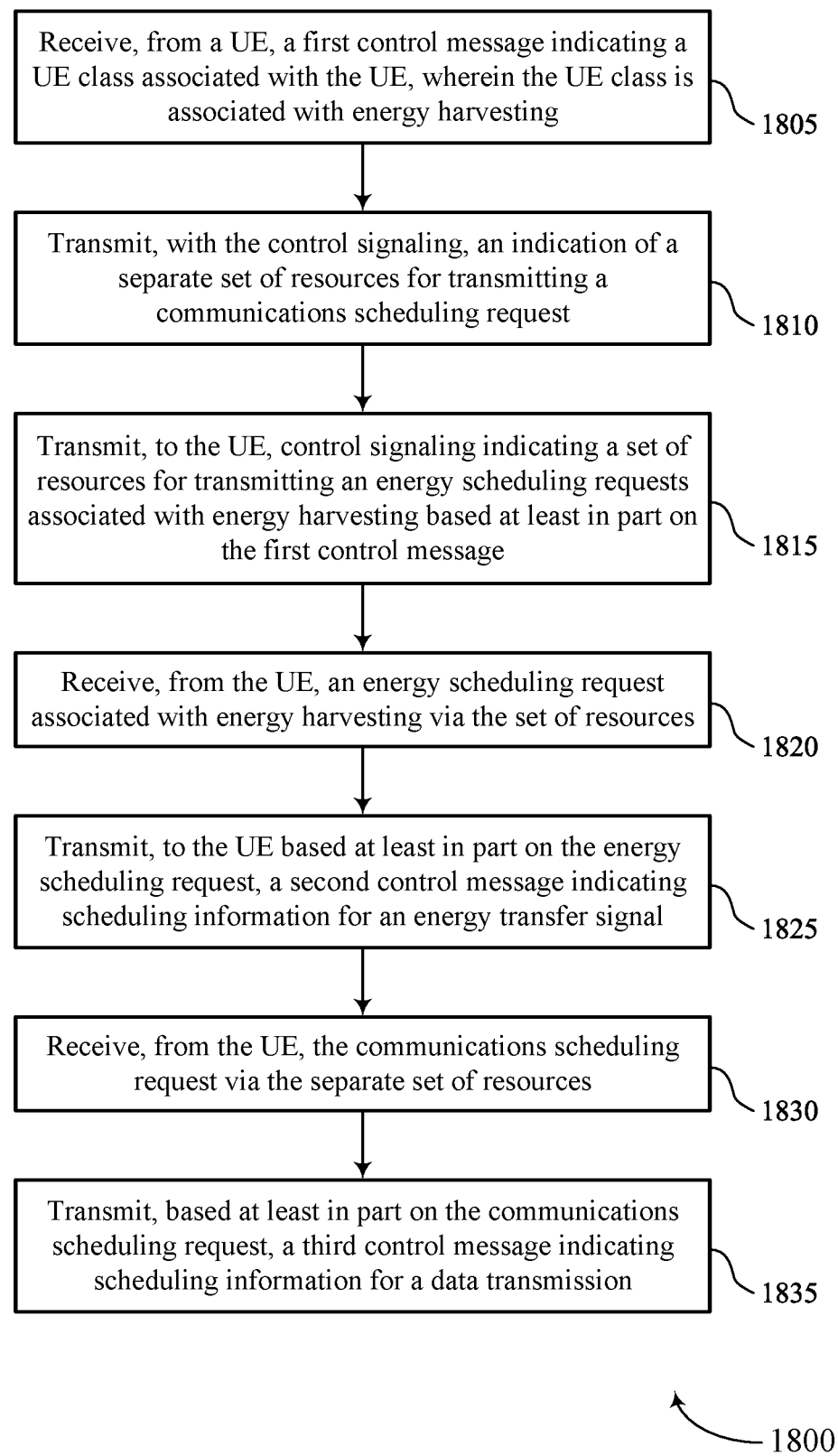

FIG. 18 shows a flowchart illustrating a method 1800 that supports device triggering backscatter communications in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a UE, a first control message indicating a UE class associated with the UE, wherein the UE class is associated with energy harvesting. The operations of 1805 may be performed in accordance with examples as disclosed herein. In some examples, aspects of the operations of 1805 may be performed by a UE class indication manager 1125 as described with reference to FIG. 11.

At 1810, the method may include transmitting, to the UE, control signaling indicating a set of resources for transmitting an energy scheduling requests associated with energy harvesting based on the first control message. The operations of 1810 may be performed in accordance with examples as disclosed herein. In some examples, aspects of the operations of 1810 may be performed by an energy scheduling request configuration manager 1130 as described with reference to FIG. 11.

At 1815, the method may include transmitting, with the control signaling, an indication of a separate set of resources for transmitting a communications scheduling request associated with energy harvesting based at least in part on the first control message. The operations of 1815 may be performed in accordance with examples as disclosed herein. In some examples, aspects of the operations of 1815 may be performed by a communications scheduling request configuration manager 1150 as described with reference to FIG. 11.

At 1820, the method may include receiving, from the UE, an energy scheduling request associated with energy harvesting via the set of resources. The operations of 1820 may be performed in accordance with examples as disclosed herein. In some examples, aspects of the operations of 1820 may be performed by an energy scheduling request manager 1135 as described with reference to FIG. 11.

At 1825, the method may include transmitting, to the UE based at least in part on the energy scheduling request, a second control message indicating scheduling information for an energy transfer signal. The operations of 1825 may be performed in accordance with examples as disclosed herein. In some examples, aspects of the operations of 1825 may be performed by an energy transfer signal scheduling manager 1140 as described with reference to FIG. 11.

At 1830, the method may include receiving, from the UE, the communications scheduling request via the separate set of resources. The operations of 1830 may be performed in accordance with examples as disclosed herein. In some examples, aspects of the operations of 1830 may be performed by a communications scheduling request manager 1155 as described with reference to FIG. 11.

At 1835, the method may include transmitting, based at least in part on the communications scheduling request, a third control message indicating scheduling information for a data transmission. The operations of 1835 may be performed in accordance with examples as disclosed herein. In some examples, aspects of the operations of 1835 may be performed by a communications scheduling manager 1160 as described with reference to FIG. 11.

The following provides an overview of aspects of the present disclosure:

Aspect 1: A method for wireless communications at a UE, comprising: transmitting a first control message indicating a UE class associated with the UE, wherein the UE class is associated with energy harvesting; receiving control signaling indicating a set of resources for transmitting energy scheduling requests associated with energy harvesting based at least in part on the first control message; transmitting an energy scheduling request associated with energy harvesting via the set of resources; and monitoring, based at least in part on the energy scheduling request, for a second control message indicating scheduling information for an energy transfer signal.

Aspect 2: The method of aspect 1, further comprising: receiving, based at least in part on the monitoring, the second control message indicating the scheduling information for the energy transfer signal; and performing energy harvesting using the energy transfer signal according to the scheduling information.

Aspect 3: The method of any of aspects 1 through 2, wherein transmitting the energy scheduling request comprises: transmitting an indication that differentiates the energy scheduling request from a communication scheduling request.

Aspect 4: The method of any of aspects 1 through 3, wherein the control signaling indicating the set of resources for transmitting the energy scheduling request indicates a joint configuration for energy scheduling requests and communication scheduling requests.

Aspect 5: The method of aspect 4, further comprising: transmitting a communications scheduling request in accordance with the joint configuration; transmitting an indication that differentiates the communications scheduling request from the energy scheduling request; and monitoring, based at least in part on the communications scheduling request, for a third control message indicating scheduling information for a data transmission.

Aspect 6: The method of any of aspects 1 through 5, wherein transmitting the energy scheduling request comprises: transmitting the energy scheduling request using a waveform based at least in part on a random access channel preamble.

Aspect 7: The method of aspect 6, wherein transmitting the energy scheduling request using the waveform based at least in part on the random access channel preamble comprises: transmitting the energy scheduling request using random access channel resources.

Aspect 8: The method of any of aspects 1 through 7, wherein transmitting the energy scheduling request comprises: transmitting the energy scheduling request using a waveform based at least in part on one or more of: a Barker code, a Zadoff-Chu sequence, or a constant amplitude zero autocorrelation waveform.

Aspect 9: The method of any of aspects 1 through 8, further comprising: detecting, based at least in part on the monitoring, an absence of a response to the energy scheduling request within a fixed time period; and transmitting a second energy scheduling request based at least in part on the absence of the response to the energy scheduling request within the fixed time period.

Aspect 10: The method of any of aspects 1 through 9, further comprising: repeating transmission of the energy scheduling request up to a fixed number of times until the UE receives the second control message indicating scheduling information for the energy transfer signal.

Aspect 11: The method of aspect 10, further comprising: receiving an indication of the fixed number of times.

Aspect 12: The method of any of aspects 1 through 11, further comprising: receiving, with the control signaling, an indication of a separate set of resources for transmitting a communications scheduling request; transmitting the communications scheduling request via the separate set of resources; and monitoring, based at least in part on the communications scheduling request, for a third control message indicating scheduling information for a data transmission.

Aspect 13: The method of any of aspects 1 through 12, wherein transmitting the energy scheduling request is based at least in part on one or more of a battery state of the UE, a power input signal strength of the UE, an energy level for one or more communications tasks at the UE, or an energy level for one or more sensor tasks at the UE.

Aspect 14: The method of any of aspects 1 through 13, wherein the UE class indicates that the UE includes passive radio circuitry and active radio circuitry.

Aspect 15: The method of aspect 14, further comprising: transitioning to an energy harvesting state based at least in part on transmitting the energy scheduling request.

Aspect 16: The method of any of aspects 14 through 15, further comprising: transmitting a communications scheduling request; and transitioning from an active radio state using the active radio circuitry to a passive radio state using the passive radio circuitry based at least in part transmitting the communications scheduling request.

Aspect 17: A method for wireless communications at a network entity, comprising: receiving, from a UE, a first control message indicating a UE class associated with the UE, wherein the UE class is associated with energy harvesting; transmitting, to the UE, control signaling indicating a set of resources for transmitting an energy scheduling requests associated with energy harvesting based at least in part on the first control message; receiving, from the UE, an energy scheduling request associated with energy harvesting via the set of resources; and transmitting, to the UE based at least in part on the energy scheduling request, a second control message indicating scheduling information for an energy transfer signal.

Aspect 18: The method of aspect 17, further comprising: transmitting the energy transfer signal according to the scheduling information.

Aspect 19: The method of any of aspects 17 through 18, wherein receiving the energy scheduling request comprises: receiving an indication that differentiates the energy scheduling request from a communication scheduling request.

Aspect 20: The method of any of aspects 17 through 19, wherein the control signaling indicating the set of resources for transmitting the energy scheduling request indicates a joint configuration for energy scheduling requests and communication scheduling requests.

Aspect 21: The method of aspect 20, further comprising: receiving a communications scheduling request in accordance with the joint configuration; receiving an indication that differentiates the communications scheduling request from the energy scheduling request; and transmitting, based at least in part on the communications scheduling request, a third control message indicating scheduling information for a data transmission.

Aspect 22: The method of any of aspects 17 through 21, wherein receiving the energy scheduling request comprises: receiving the energy scheduling request using a waveform based at least in part on a random access channel preamble.

Aspect 23: The method of aspect 22, wherein receiving the energy scheduling request using the waveform based at least in part on the random access channel preamble comprises: receiving the energy scheduling request using random access channel resources.

Aspect 24: The method of any of aspects 17 through 23, wherein receiving the energy scheduling request comprises: receiving the energy scheduling request using a waveform based at least in part on one or more of: a Barker code, a Zadoff-Chu sequence, or a constant amplitude zero autocorrelation waveform.

Aspect 25: The method of any of aspects 17 through 24, further comprising: transmitting, to the UE, an indication of a fixed number of times to repeat transmission of the energy scheduling request.

Aspect 26: The method of any of aspects 17 through 25, further comprising: transmitting, with the control signaling, an indication of a separate set of resources for transmitting a communications scheduling request; receiving, from the UE, the communications scheduling request via the separate set of resources; and transmitting, based at least in part on the communications scheduling request, a third control message indicating scheduling information for a data transmission.

Aspect 27: The method of any of aspects 17 through 26, wherein the UE class indicates that the UE includes passive radio circuitry and active radio circuitry.

Aspect 28: The method of aspect 27, further comprising: transitioning from a listening state to an active radio state based at least in part on receiving the energy scheduling request.

Aspect 29: An apparatus for wireless communications at a UE, comprising at least one processor; memory coupled with the at least processor; and instructions stored in the memory and executable by the at least one processor to cause the UE to perform a method of any of aspects 1 through 16.

Aspect 30: An apparatus for wireless communications at a UE, comprising at least one means for performing a method of any of aspects 1 through 16.

Aspect 31: A non-transitory computer-readable medium storing code for wireless communications at a UE, the code comprising instructions executable by at least one processor to perform a method of any of aspects 1 through 16.

Aspect 32: An apparatus for wireless communications at a network entity, comprising at least one processor; memory coupled with the at least one processor; and instructions stored in the memory and executable by the at least one processor to cause the apparatus to perform a method of any of aspects 17 through 28.

Aspect 33: An apparatus for wireless communications at a network entity, comprising at least one means for performing a method of any of aspects 17 through 28.

Aspect 34: A non-transitory computer-readable medium storing code for wireless communications at a network entity, the code comprising instructions executable by at least one processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    at least one processor; and
    memory coupled with the at least one processor, the memory storing instructions executable by the at least one processor, directly or after compilation, to cause the UE to:
        transmit a first control message that includes an indication of a UE class associated with the UE, wherein the indication of the UE class indicates that the UE is a semi-passive type UE;
        receive control signaling indicating a set of resources for transmitting energy scheduling requests associated with energy harvesting, wherein reception of the control signaling that indicates the set of resources is based at least in part on the indication in the first control message that the UE is the semi-passive type UE;
        transmit an energy scheduling request associated with energy harvesting via the set of resources, wherein the energy scheduling request is transmitted as an active transmission initiated by the UE via the set of resources in accordance with the UE being the semi-passive type UE; and
        monitor, based at least in part on the energy scheduling request, for a second control message indicating scheduling information for an energy transfer signal.

2. The apparatus of claim 1, wherein the instructions are further executable by the at least one processor, directly or after compilation, to cause the UE to:
    receive, based at least in part on the monitoring, the second control message indicating the scheduling information for the energy transfer signal; and
    perform energy harvesting using the energy transfer signal according to the scheduling information.

3. The apparatus of claim 1, wherein the instructions to transmit the energy scheduling request are executable by the at least one processor, directly or after compilation, to cause the UE to:
    transmit an indication that differentiates the energy scheduling request from a communication scheduling request based at least in part on the control signaling indicating that the set of resources are available for transmission of communication scheduling requests.

4. The apparatus of claim 1, wherein the control signaling indicating the set of resources for transmitting the energy scheduling request indicates a joint configuration for the energy scheduling requests and communication scheduling requests.

5. The apparatus of claim 4, wherein the instructions are further executable by the at least one processor, directly or after compilation, to cause the UE to:
    transmit a communications scheduling request in accordance with the joint configuration;

transmit an indication that differentiates the communications scheduling request from the energy scheduling request; and monitor, based at least in part on the communications scheduling request, for a third control message indicating second scheduling information for a data transmission.

6. The apparatus of claim 1, wherein the instructions to transmit the energy scheduling request are executable by the at least one processor, directly or after compilation, to cause the UE to:

transmit the energy scheduling request using a waveform based at least in part on a random access channel preamble.

7. The apparatus of claim 6, wherein the instructions to transmit the energy scheduling request using the waveform based at least in part on the random access channel preamble are executable by the at least one processor, directly or after compilation, to cause the UE to:

transmit the energy scheduling request using random access channel resources.

8. The apparatus of claim 1, wherein the instructions to transmit the energy scheduling request are executable by the at least one processor, directly or after compilation, to cause the UE to:

transmit the energy scheduling request using a waveform based at least in part on one or more of: a Barker code, a Zadoff-Chu sequence, or a constant amplitude zero autocorrelation waveform.

9. The apparatus of claim 1, wherein the instructions are further executable by the at least one processor, directly or after compilation, to cause the UE to:

detect, based at least in part on the monitoring, an absence of a response to the energy scheduling request within a fixed time period; and transmit a second energy scheduling request based at least in part on the absence of the response to the energy scheduling request within the fixed time period.

10. The apparatus of claim 1, wherein the instructions are further executable by the at least one processor, directly or after compilation, to cause the UE to:

repeat transmission of the energy scheduling request up to a fixed number of times until the UE receives the second control message indicating the scheduling information for the energy transfer signal.

11. The apparatus of claim 10, wherein the instructions are further executable by the at least one processor, directly or after compilation, to cause the UE to:

receive an indication of the fixed number of times.

12. The apparatus of claim 1, wherein the instructions are further executable by the at least one processor, directly or after compilation, to cause the UE to:

receive, with the control signaling, an indication of a separate set of resources for transmitting a communications scheduling request;

transmit the communications scheduling request via the separate set of resources; and monitor, based at least in part on the communications scheduling request, for a third control message indicating second scheduling information for a data transmission.

13. The apparatus of claim 1, wherein transmitting the energy scheduling request is based at least in part on one or more of a battery state of the UE, a power input signal strength of the UE, an energy level for one or more communications tasks at the UE, or an energy level for one or more sensor tasks at the UE.

14. The apparatus of claim 1, wherein the UE class indicates that the UE includes passive radio circuitry and active radio circuitry.

15. The apparatus of claim 14, wherein the instructions are further executable by the at least one processor, directly or after compilation, to cause the UE to:

transition to an energy harvesting state based at least in part on transmitting the energy scheduling request.

16. The apparatus of claim 14, wherein the instructions are further executable by the at least one processor, directly or after compilation, to cause the UE to:

transmit a communications scheduling request; and transition from an active radio state using the active radio circuitry to a passive radio state using the passive radio circuitry based at least in part on transmitting the communications scheduling request.

17. The apparatus of claim 1, wherein the control signaling indicates the set of resources are for transmission of UE-triggered scheduling requests associated with energy harvesting.

18. An apparatus for wireless communications at a network entity, comprising:

at least one processor; and memory coupled with the at least one processor, the memory storing instructions executable by the at least one processor, directly or after compilation, to cause the network entity to:

receive, from a user equipment (UE), a first control message that includes an indication of a UE class associated with the UE, wherein the indication of the UE class indicates that the UE is a semi-passive type UE;

transmit, to the UE, control signaling indicating a set of resources for transmitting energy scheduling requests associated with energy harvesting, wherein transmission of the control signaling that indicates the set of resources is based at least in part on the indication in the first control message that the UE is the semi-passive type UE;

receive, from the UE, an energy scheduling request associated with energy harvesting via the set of resources, wherein the energy scheduling request is an active transmission via the set of resources in accordance with the UE being the semi-passive type UE; and transmit, to the UE based at least in part on the energy scheduling request, a second control message indicating scheduling information for an energy transfer signal.

19. The apparatus of claim 18, wherein the instructions are further executable by the at least one processor, directly or after compilation, to cause the network entity to:

transmit the energy transfer signal according to the scheduling information.

20. The apparatus of claim 18, wherein the instructions to receive the energy scheduling request are executable by the at least one processor, directly or after compilation, to cause the network entity to:

receive an indication that differentiates the energy scheduling request from a communication scheduling request based at least in part on the control signaling indicating that the set of resources are available for transmission of communication scheduling requests.

21. The apparatus of claim 18, wherein the control signaling indicating the set of resources for transmitting the energy scheduling request indicates a joint configuration for the energy scheduling requests and communication scheduling requests.

22. The apparatus of claim 21, wherein the instructions are further executable by the at least one processor, directly or after compilation, to cause the network entity to:
receive a communications scheduling request in accordance with the joint configuration;
receive an indication that differentiates the communications scheduling request from the energy scheduling request; and
transmit, based at least in part on the communications scheduling request, a third control message indicating second scheduling information for a data transmission.

23. The apparatus of claim 18, wherein the instructions to receive the energy scheduling request are executable by the at least one processor, directly or after compilation, to cause the network entity to:
receive the energy scheduling request using a waveform based at least in part on a random access channel preamble.

24. The apparatus of claim 23, wherein the instructions to receive the energy scheduling request using the waveform based at least in part on the random access channel preamble are executable by the at least one processor, directly or after compilation, to cause the network entity to:
receive the energy scheduling request using random access channel resources.

25. The apparatus of claim 18, wherein the instructions are further executable by the at least one processor, directly or after compilation, to cause the network entity to:
transmit, to the UE, an indication of a fixed number of times to repeat transmission of the energy scheduling request.

26. The apparatus of claim 18, wherein the instructions are further executable by the at least one processor, directly or after compilation, to cause the network entity to:
transmit, with the control signaling, an indication of a separate set of resources for transmitting a communications scheduling request;
receive, from the UE, the communications scheduling request via the separate set of resources; and
transmit, based at least in part on the communications scheduling request, a third control message indicating second scheduling information for a data transmission.

27. The apparatus of claim 18, wherein the UE class indicates that the UE includes passive radio circuitry and active radio circuitry.

28. The apparatus of claim 27, wherein the instructions are further executable by the at least one processor, directly or after compilation, to cause the network entity to:
transition from a listening state to an active radio state based at least in part on receiving the energy scheduling request.

29. A method for wireless communications at a user equipment (UE), comprising:
transmitting a first control message that includes an indication of a UE class associated with the UE, wherein the indication of the UE class indicates that the UE is a semi-passive type UE;
receiving control signaling indicating a set of resources for transmitting energy scheduling requests associated with energy harvesting, wherein reception of the control signaling that indicates the set of resources is based at least in part on the indication in the first control message that the UE is the semi-passive type UE;
transmitting an energy scheduling request associated with energy harvesting via the set of resources, wherein the energy scheduling request is transmitted as an active transmission initiated by the UE via the set of resources in accordance with the UE being the semi-passive type UE; and
monitoring, based at least in part on the energy scheduling request, for a second control message indicating scheduling information for an energy transfer signal.

30. A method for wireless communications at a network entity, comprising:
receiving, from a user equipment (UE), a first control message that includes an indication of a UE class associated with the UE, wherein the indication of the UE class indicates that the UE is a semi-passive type UE;
transmitting, to the UE, control signaling indicating a set of resources for transmitting energy scheduling requests associated with energy harvesting, wherein transmission of the control signaling that indicates the set of resources is based at least in part on the indication in the first control message that the UE is the semi-passive type UE;
receiving, from the UE, an energy scheduling request associated with energy harvesting via the set of resources, wherein the energy scheduling request is an active transmission via the set of resources in accordance with the UE being the semi-passive type UE; and
transmitting, to the UE based at least in part on the energy scheduling request, a second control message indicating scheduling information for an energy transfer signal.

\* \* \* \* \*